United States Patent
Jin et al.

(10) Patent No.: US 10,963,854 B2
(45) Date of Patent: Mar. 30, 2021

(54) BLOCKCHAIN-BASED ELECTRONIC BILL REIMBURSEMENT METHOD, APPARATUS, AND ELECTRONIC DEVICE

(71) Applicant: Advanced New Technologies Co., Ltd., George Town (KY)

(72) Inventors: Ge Jin, Hangzhou (CN); Longsheng Qing, Hangzhou (CN); Zhen Sun, Hangzhou (CN); Zhenzhong Meng, Hangzhou (CN); Xueqing Yang, Hangzhou (CN); Yu Chu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,173

(22) Filed: Jan. 31, 2020

(65) Prior Publication Data
US 2020/0242577 A1    Jul. 30, 2020

Related U.S. Application Data

(63) Continuation of application No. PCT/CN2020/072182, filed on Jan. 15, 2020.

(30) Foreign Application Priority Data

Jul. 31, 2019  (CN) .......................... 201910703765.4

(51) Int. Cl.
*G06Q 20/14* (2012.01)
*G06Q 30/04* (2012.01)
(Continued)

(52) U.S. Cl.
CPC .......... *G06Q 20/14* (2013.01); *G06F 16/2379* (2019.01); *G06F 16/27* (2019.01);
(Continued)

(58) Field of Classification Search
CPC .......... G06Q 20/14; G06Q 40/12; G06Q 10/10
(Continued)

(56) References Cited

U.S. PATENT DOCUMENTS

| 5,892,900 A | 4/1999 | Ginter et al. |
| 2003/0126048 A1 | 7/2003 | Hollar et al. |

(Continued)

FOREIGN PATENT DOCUMENTS

| CN | 108197226 | 6/2018 |
| CN | 108648066 | 10/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Florian M Zeender
*Assistant Examiner* — Christopher R Buchanan
(74) *Attorney, Agent, or Firm* — Fish & Richardson P.C.

(57) ABSTRACT

One or more implementations of the present specification provide a blockchain-based electronic bill reimbursement method, apparatus, and an electronic device. The blockchain stores electronic bills. The method includes determining whether a maintained target electronic bill is in an unreimbursed state in response to detecting a reimbursement transaction broadcasted by a reimbursement initiator for the target electronic bill to the blockchain; if the target electronic bill is in the unreimbursed state, updating the target electronic bill from the unreimbursed state to a reimbursement lock state; instructing a reimbursement acceptor to perform reimbursement processing on the target electronic bill; determining whether a reimbursement result corresponding to the target electronic bill is broadcasted by the (Continued)

reimbursement acceptor to the blockchain; and if the reimbursement result is detected, updating the target electronic bill from the reimbursement lock state to a reimbursed state.

20 Claims, 10 Drawing Sheets

(51) Int. Cl.
 *G06F 16/23* (2019.01)
 *G06Q 40/00* (2012.01)
 *G06F 16/27* (2019.01)
 *G06Q 10/10* (2012.01)
(52) U.S. Cl.
 CPC ............. *G06Q 10/10* (2013.01); *G06Q 30/04* (2013.01); *G06Q 40/12* (2013.12)
(58) Field of Classification Search
 USPC ..................................................... 705/34, 30
 See application file for complete search history.

(56) References Cited

U.S. PATENT DOCUMENTS

| | | | |
|---|---|---|---|
| 2004/0088255 | A1 | 5/2004 | Zielke et al. |
| 2008/0040265 | A1 | 2/2008 | Rackley, III et al. |
| 2010/0030675 | A1 | 2/2010 | Hanan et al. |
| 2013/0138570 | A1 | 5/2013 | Ross |
| 2017/0004550 | A1 | 1/2017 | Shaaban et al. |
| 2018/0053161 | A1* | 2/2018 | Bordash ................. G06Q 20/02 |
| 2018/0075536 | A1 | 3/2018 | Jayaram et al. |
| 2019/0080284 | A1 | 3/2019 | Kim et al. |
| 2019/0205884 | A1 | 7/2019 | Batra et al. |
| 2019/0311353 | A1* | 10/2019 | Solis ................... G06Q 20/381 |
| 2019/0372776 | A1* | 12/2019 | Kroneisen ............. H04L 9/3239 |
| 2020/0042960 | A1 | 2/2020 | Cook et al. |
| 2020/0074389 | A1* | 3/2020 | Mohammad ......... G06Q 10/087 |
| 2020/0118207 | A1* | 4/2020 | Jovanovic ............ G06Q 20/389 |
| 2020/0160328 | A1* | 5/2020 | Yan ....................... G06O 20/389 |
| 2020/0211005 | A1* | 7/2020 | Bodorik ................. G06Q 10/00 |

FOREIGN PATENT DOCUMENTS

| | | |
|---|---|---|
| CN | 109165957 | 1/2019 |
| CN | 109214903 | 1/2019 |
| CN | 109308657 | 2/2019 |
| CN | 109325812 | 2/2019 |
| CN | 109345194 | 2/2019 |
| CN | 109360077 | 2/2019 |
| CN | 109523242 | 3/2019 |
| CN | 109685967 | 4/2019 |
| CN | 110009435 | 7/2019 |
| CN | 110060064 | 7/2019 |
| CN | 110060189 | 7/2019 |
| CN | 110473081 | 11/2019 |

OTHER PUBLICATIONS

Nakamoto, "Bitcoin: A Peer-to-Peer Electronic Cash System," www.bitcoin.org, 2005, 9 pages.
U.S. Appl. No. 16/779,198, Sun et al., filed Jan. 31, 2020.
U.S. Appl. No. 16/779,511, Yang et al., filed Jan. 31, 2020.
U.S. Appl. No. 16/783,075, Yang et al., filed Feb. 5, 2020.
U.S. Appl. No. 16/783,094, Qing, filed Feb. 5, 2020.
U.S. Appl. No. 16/783,098, Meng et al., filed Feb. 5, 2020.
PCT International Search Report and Written Opinion in International Application No. PCT/CN2020/072182, dated Apr. 24, 2020, 20 pages (with machine translation).

\* cited by examiner

BLOCKCHAIN-BASED ELECTRONIC BILL REIMBURSEMENT METHOD, APPARATUS, AND ELECTRONIC DEVICE

CROSS-REFERENCE TO RELATED APPLICATIONS

This application is a continuation of PCT Application No. PCT/CN2020/072182, filed on Jan. 15, 2020, which claims priority to Chinese Patent Application No. 201910703765.4, filed on Jul. 31, 2019, and each application is hereby incorporated by reference in its entirety.

TECHNICAL FIELD

One or more implementations of the present specification relate to the field of blockchain technologies, and in particular, to a blockchain-based electronic bill reimbursement method, apparatus, and an electronic device.

BACKGROUND

Blockchain technology, also known as distributed ledger technology, is an emerging technology in which several computing devices participate in "record-keeping" and jointly maintain a complete distributed database. Since blockchain technology has the characteristics of decentralization, openness, and transparency, each computing device can participate in database records, and data can be quickly synchronized between computing devices, blockchain technology has been widely used in many fields.

SUMMARY

The present specification provides a blockchain-based electronic bill reimbursement method, where the method is applied to a node on the blockchain, the blockchain stores electronic bills, and the method includes: determining whether a maintained target electronic bill is in an unreimbursed state when a reimbursement transaction broadcasted by a reimbursement initiator for the target electronic bill to the blockchain is monitored; if the target electronic bill is in the unreimbursed state, updating the target electronic bill from the unreimbursed state to a reimbursement lock state, and after the target electronic bill is updated to the reimbursement lock state, instructing a reimbursement acceptor to perform reimbursement processing on the target electronic bill; determining whether a reimbursement result corresponding to the target electronic bill and broadcasted by the reimbursement acceptor to the blockchain is monitored; and if the reimbursement result is monitored, updating the target electronic bill from the reimbursement lock state to a reimbursed state.

Optionally, determining whether a maintained target electronic bill is in an unreimbursed state when a reimbursement transaction broadcasted by a reimbursement initiator for the target electronic bill to the blockchain is monitored includes: invoking, in response to the reimbursement transaction, a reimbursement verification logic specified in a smart contract deployed on the blockchain to perform reimbursement verification on the reimbursement initiator; and determining, in response to a monitored verification success event generated by the smart contract and corresponding to the reimbursement initiator, whether the maintained target electronic bill is in the unreimbursed state.

Optionally, the reimbursement criteria include reimbursement permission criteria, reimbursement amount criteria, and reimbursement duration criteria.

Optionally, the reimbursement acceptor subscribes to a bill state of the target electronic bill maintained by the node; and after the target electronic bill is updated to the reimbursement lock state, instructing a reimbursement acceptor to perform reimbursement processing on the target electronic bill, includes: after the target electronic bill is updated to the reimbursement lock state, pushing the reimbursement lock state of the target electronic bill to the reimbursement acceptor, so as to trigger the reimbursement acceptor to perform reimbursement processing on the target electronic bill in the reimbursement lock state.

Optionally, the method further includes: if the reimbursement result is not monitored within predetermined duration, updating the target electronic bill from the reimbursement lock state to the unreimbursed state.

Optionally, the method further includes: if the target electronic bill is in the reimbursement lock state, sending, to the reimbursement initiator, a notification message used to indicate that reimbursement for the target electronic bill fails.

The present specification further provides a blockchain-based electronic bill reimbursement apparatus, where the apparatus is applied to a node on the blockchain, the blockchain stores electronic bills, and the apparatus includes: a determining module, configured to determine whether a maintained target electronic bill is in an unreimbursed state when a reimbursement transaction broadcasted by a reimbursement initiator for the target electronic bill to the blockchain is monitored; a first update module, configured to: if the target electronic bill is in the unreimbursed state, update the target electronic bill from the unreimbursed state to a reimbursement lock state, and after the target electronic bill is updated to the reimbursement lock state, instruct a reimbursement acceptor to perform reimbursement processing on the target electronic bill; a monitoring module, configured to determine whether a reimbursement result corresponding to the target electronic bill and broadcasted by the reimbursement acceptor to the blockchain is monitored; and a second update module, configured to: if the reimbursement result is monitored, update the target electronic bill from the reimbursement lock state to a reimbursed state.

Optionally, the determining module is configured to: invoke, in response to the reimbursement transaction, a reimbursement verification logic specified in a smart contract deployed on the blockchain to perform reimbursement verification on the reimbursement initiator; and determine, in response to a monitored verification success event generated by the smart contract and corresponding to the reimbursement initiator, whether the maintained target electronic bill is in the unreimbursed state.

Optionally, the reimbursement criteria include reimbursement permission criteria, reimbursement amount criteria, and reimbursement duration criteria.

Optionally, the reimbursement acceptor subscribes to a bill state of the target electronic bill maintained by the node; and the first update module is configured to: after the target electronic bill is updated to the reimbursement lock state, push the reimbursement lock state of the target electronic bill to the reimbursement acceptor, so as to trigger the reimbursement acceptor to perform reimbursement processing on the target electronic bill in the reimbursement lock state.

Optionally, the apparatus further includes: a third update module, configured to: if the reimbursement result is not monitored within predetermined duration, update the target electronic bill from the reimbursement lock state to the unreimbursed state.

Optionally, the apparatus further includes: a sending module, configured to: if the target electronic bill is in the reimbursement lock state, send, to the reimbursement initiator, a notification message used to indicate that reimbursement for the target electronic bill fails.

The present specification further provides an electronic device, including: a processor; and a memory, configured to store instructions that can be executed by the processor; where the processor implements steps of the method by running the executable instructions.

The present specification further provides a computer readable storage medium on which computer instructions are stored, and steps of the method are implemented when the instructions are executed by a processor.

In the previous technical solution, the maintained electronic bill can be updated to the reimbursement lock state when the reimbursement transaction for the electronic bill in the unreimbursed state broadcasted by the reimbursement initiator to the blockchain is monitored, and after the electronic bill is updated to the reimbursement lock state, the reimbursement acceptor can further be instructed to perform reimbursement processing on the electronic bill. Subsequently, if the reimbursement result that is corresponding to the electronic bill and that is broadcasted by the reimbursement acceptor to the blockchain is monitored, the maintained electronic bill can be updated to the reimbursed state. As such, the electronic bill stored in the blockchain can be reimbursed. In addition, repeated reimbursement for the electronic bill can be avoided because subsequent processing cannot be performed on the reimbursement transaction of the electronic bill in the reimbursement lock state or reimbursed state.

DESCRIPTION OF IMPLEMENTATIONS

Figure 1:
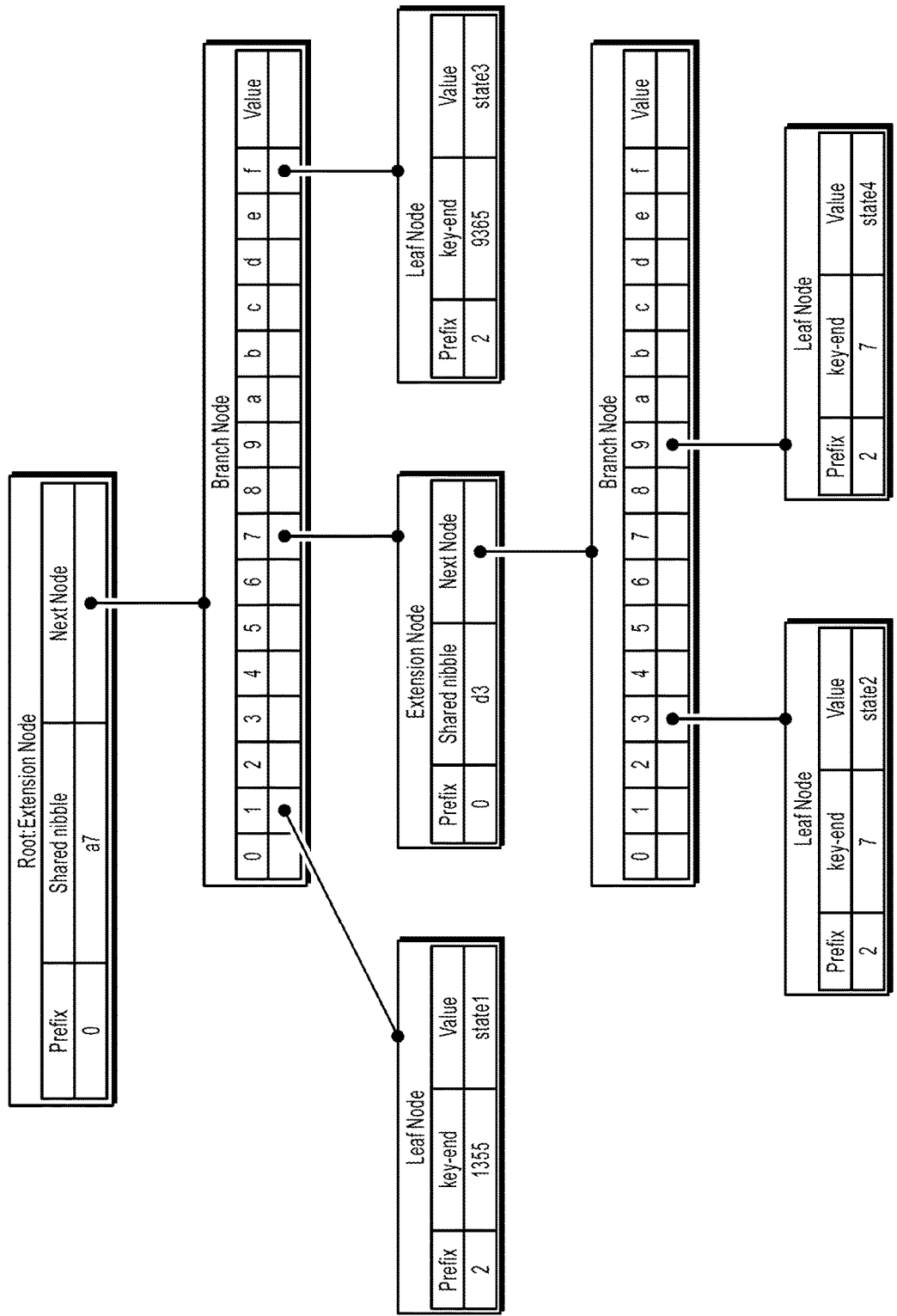
FIG. 1 is a schematic diagram of organizing account state data of a blockchain into an MPT state tree, according to the present specification.

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with the present specification. On the contrary, the implementations are only examples of apparatus and methods that are described in the appended claims in detail and consistent with some aspects of the present specification.

It is worthwhile to note that, in other implementations, steps of a corresponding method are not necessarily performed according to a sequence shown and described in the present specification. In some other implementations, the method can include more or less steps than those described in the present specification. In addition, a single step described in the present specification can be broken down into multiple steps in other implementations for description. However, the multiple steps described in the present specification can also be combined into a single step for description in other implementations.

Blockchains can generally be classified into three types: public blockchains, private blockchains, and consortium blockchains. In addition, there are several types of combinations, such as private blockchain+consortium blockchain and consortium blockchain+public blockchain.

The public blockchain has the highest degree of decentralization. The public blockchain is represented by Bitcoin and Ethereum. Participants (also referred to as blockchain nodes) who join the public blockchain can read on-chain data records, participate in transactions, and compete for accounting rights of new blocks. In addition, each node can freely join or exit a network and perform related operations.

On the contrary, a write right of the private blockchain network is controlled by a certain organization or institution, and a data reading right is specified by the organization. In short, the private blockchain can be a weak centralization system, and participating nodes are strictly limited and rare. This type of blockchain is more suitable for internal use within a specific organization.

The consortium blockchain is a blockchain balanced between the public blockchain and the private blockchain, and can be "partially decentralized". Each node in the consortium blockchain usually has a corresponding entity institution or organization. Nodes join the network through authorization and form interest-related consortiums to jointly maintain blockchain operation.

Based on the basic characteristics of the blockchain, the blockchain usually consists of several blocks. Timestamps corresponding to creation moments of these blocks are separately recorded in these blocks, and all the blocks strictly form a time-ordered data chain based on the timestamps recorded in the blocks.

For real data generated in the physical world, the data can be formed into a standard transaction format supported by the blockchain, and then broadcasted to the blockchain. Nodes in the blockchain perform consensus processing on the received transaction. After the consensus is reached, a node serving as a bookkeeping node in the blockchain seals the transaction into a block and persistently stores the transaction in the blockchain.

Consensus algorithms supported in the blockchain can include: a first-type consensus algorithm where a node needs to compete for the bookkeeping right in each round of bookkeeping, such as Proof of Work (POW), Proof of Stake (POS), and Delegated Proof of Stake (DPOS); a second-type consensus algorithm where a bookkeeping node is elected in advance for each round of bookkeeping (there is no need to compete for the bookkeeping right), such as a Practical Byzantine Fault Tolerance (PBFT).

In a blockchain network using the first-type consensus algorithm, all nodes that compete for the bookkeeping right can execute a transaction after receiving the transaction. One of the nodes that compete for the bookkeeping right can prevail in a current round and become the bookkeeping node. The bookkeeping node can seal a received transaction with other transactions to generate a latest block, and send the generated latest block or a block header of the latest block to other nodes for reaching consensus.

In a blockchain network using the second-type consensus algorithm, a node having the bookkeeping right has been agreed upon before the current round of bookkeeping. Therefore, after receiving a transaction, a node can send the transaction to the bookkeeping node if the node is not the bookkeeping node of the current round. The bookkeeping node in the current round can execute the transaction when or before packaging the transaction with other transactions to generate a latest block. After generating the latest block, the bookkeeping node can send the latest block or a block header of the latest block to other nodes for reaching consensus.

As described above, regardless of which consensus algorithm is used in the blockchain, the bookkeeping node in the current round can seal the received transaction to generate the latest block, and send the generated latest block or the block header of the latest block to other nodes for consensus verification. After receiving the latest block or the block header of the latest block, if the other nodes verify that the latest block is correct, the other nodes can append the latest block to the end of the original blockchain, so as to complete a bookkeeping process of the blockchain. In the process of verifying a new block or block header from the bookkeeping node, the other nodes can also execute a transaction included in the block.

In the blockchain field, an important concept is account. Taking Ethereum as an example, Ethereum usually divides accounts into external accounts and contract accounts. The external account is an account directly controlled by a user, and is also called a user account. The contract account is created by the user through an external account and contains a contract code (that is, a smart contract). Certainly, for some blockchain projects (for example, Ant Blockchain) derived from an Ethereum-based architecture, account types supported by the blockchain can be further extended, and are not specifically limited in the present specification.

The state of an account in the blockchain is usually maintained through a structural body. When a transaction in a block is executed, the state of an account associated with the transaction in the blockchain usually changes.

Taking Ethereum as an example, a structural body of an account usually includes fields such as Balance, Nonce, Code, and Storage, where: the Balance field is used to maintain the current account balance; the Nonce field is used to maintain the number of transactions of the account, and is a counter used to ensure that each transaction can be processed only once, effectively avoiding replay attacks; the Code field is used to maintain the contract code of the account; in practice, the Code field usually maintains only the hash value of the contract code; therefore, the Code field is also commonly referred to as a Codehash field; and the Storage field is used to maintain the storage content of the account (the default field value is null). For the contract account, an independent storage space is usually allocated to store the content of the contract account. The independent storage space is commonly referred to as the account storage of the contract account. The storage content of the contract account usually constructs a data structure of a Merkle Patricia Trie (MPT) tree and stored in the above-mentioned independent storage space. An MPT tree constructed based on the storage content of the contract account is usually referred to as a Storage tree. The Storage field usually maintains only the root node of the Storage tree. Therefore, the Storage field is also commonly referred to as a Storage-Root field.

For an external account, field values of both the Code field and the Storage field shown above are null.

In most blockchain projects, the Merkle tree is usually used, or data is stored and maintained based on a data structure of the Merkle tree. Taking Ethereum as an example, the MPT tree (a variant of the Merkle tree) is used in Ethereum as a data organization form to organize and manage important data such as account state and transaction information.

For data to be stored and maintained in the blockchain, Ethereum uses three MPT trees: MPT state tree, MPT transaction tree, and MPT receipt tree. In addition to the previous three MPT trees, there is actually a storage tree constructed based on storage content of a contract account.

The MPT state tree is an MPT tree organized by account state data of all accounts in the blockchain. The MPT transaction tree is an MPT tree organized by transaction data in the blockchain. The MPT receipt tree is an MPT tree organized by a transaction receipt corresponding to each transaction generated after the transaction in the block is executed. Hash values of root nodes of the MPT state tree, the MPT transaction tree, and the MPT receipt tree are finally added to block headers of corresponding blocks.

Both the MPT transaction tree and the MPT receipt tree are corresponding to blocks, that is, each block has its own MPT transaction tree and MPT receipt tree. The MPT state tree is a global MPT tree, and does not correspond to a specific block, but covers account state data of all accounts in the blockchain.

Organized MPT transaction tree, MPT receipt tree, and MPT state tree are finally stored in a Key-Value type database (for example, LevelDB) that uses a multi-level data storage structure.

The previous database that uses the multi-level data storage structure can be divided into n-level data storage. For example, data storage at all levels can be successively set to L0, L1, L2, L3, . . . , and L (n−1). For data storage at all levels in the previous database, a smaller level number usually corresponds to a higher level. For example, L0 stores data of several latest blocks, L1 stores data of several secondary-latest blocks, and so on.

Reading and writing performance of a storage medium corresponding to each level of data storage can usually be different. For example, reading/writing performance of a storage medium corresponding to data storage of a higher level (that is, a smaller level number) can be higher than reading/writing performance of a storage medium corresponding to data storage of a lower level. In practice, a storage medium with a relatively high storage cost and high storage performance can be used for high-level data storage, and a storage medium with a low unit cost and a relatively large capacity can be used for low-level data storage.

In practice, as a block number of the blockchain increases (also referred to as a block height), data stored in a database includes many historical data. In addition, data in a block with a smaller block number is more aged and is less important. Therefore, to reduce overall storage costs, data of different block heights can usually be "treated differently". For example, data in a block with a smaller block number can be stored in a storage medium with a lower cost, and data in a block with a larger block number is stored in a storage medium with a higher cost.

It is worthwhile to note that, each time a latest block is generated in the blockchain, after a transaction in the latest block is executed, an account state of a related account (which can be an external account or a contract account) of the executed transaction in the blockchain usually changes accordingly.

For example, when a "transfer transaction" in a block is executed, balances of transfer-out and transfer-in accounts associated with the "transfer transaction" (that is, field values of the Balance fields of these accounts) usually change accordingly.

After the transaction in the latest block generated in the blockchain is executed, because an account state in the current blockchain changes, a node needs to construct an MPT state tree based on current account state data of all accounts in the blockchain, so as to maintain the latest states of all accounts in the blockchain.

That is, each time a latest block is generated in the blockchain, after a transaction in the latest block is executed, an account state in the blockchain changes, and the node needs to reconstruct an MPT state tree based on the latest account state data of all accounts in the blockchain. In other words, each block in the blockchain has a corresponding MPT state tree. The MPT state tree maintains the latest account states of all accounts in the blockchain after a transaction in the block is executed.

Referring to FIG. 1, FIG. 1 is a schematic diagram of organizing account state data of a blockchain into an MPT state tree, according to the present specification.

The MPT tree is an improved Merkle tree variant and incorporates advantages of the Merkle tree and the Trie dictionary tree (also referred to as a prefix tree).

The MPT tree usually includes three types of data nodes: leaf node, extension node, and branch node.

The leaf node is a key value pair represented as [key, value], where key is a special hexadecimal code character, and value is state data (that is, the structural body shown above) of an account address corresponding to the leaf node. The extension node is also a key value pair represented as [key, value], where key is also a special hexadecimal code character, but value is a hash value (hash index) of another node, that is, can be linked to another node by using a hash index.

The branch node contains 17 elements, the first 16 elements correspond to 16 possible hexadecimal characters in the key, and one character corresponds to one nibble (half byte). If a [key, value] terminates at this branch node, the branch node can act as a leaf node, and the last element represents a value of the leaf node. Conversely, the last element of the branch node can be null.

Characters on a search path from a root node to a leaf node on an MPT tree form a complete account address. Therefore, a branch node can be a terminal node of the search path or can be an intermediate node of the search path.

Assume that account state data that needs to be organized into an MPT state tree is shown in Table 1:

TABLE 1

| Account address (Key) | | | | | | Account state (Value) |
|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a string of several hexadecimal characters. The account state is a structural body formed by fields such as Balance, Nonce, Code, and Storage.

Finally, the MPT state tree is organized based on the account state data in Table 1. Referring to FIG. 1, the MPT state tree includes four leaf nodes, two branch nodes, and two extension nodes.

In FIG. 1, the prefix field is commonly owned by an extension node and a leaf node. Different field values of the prefix field can be used to indicate different node types.

For example, value 0 of the prefix field indicates an extension node that includes an even number of nibbles. As mentioned above, nibble represents a half byte, and consists of four binary bits. One nibble can correspond to one character that forms an account address. Value 1 of the prefix field indicates an extension node that includes an odd number of nibbles. Value 2 of the prefix field indicates a leaf node that includes an even number of nibbles. Value 3 of the prefix field indicates a leaf node that includes an odd number of nibbles.

However, the branch node does not have the prefix field because the branch node is a prefix node parallel to a single nibble.

The Shared nibble field in the extension node corresponds to a key value of a key value pair included in the extension node and indicates a common character prefix between account addresses. For example, all account addresses in the previous table have a common character prefix a7. The Next Node field is filled with a hash value (hash index) of a next node.

Hexadecimal characters 0 to f fields in a branch node correspond to a key value of a key value pair included in the branch node. If the branch node is an intermediate node whose account address is on a search path in an MPT tree, the Value field of the branch node can be null. The 0 to f fields are used to populate the hash value of the next node.

Key-end in a leaf node corresponds to a key value of a key value pair included in the leaf node, and represents last several characters of an account address. Key values of all nodes on a search path starting from a root node to a leaf node construct a complete account address. The Value field of the leaf node populates account state data corresponding to the account address. For example, a structural body including the previous Balance, Nonce, Code, and Storage fields can be filled in the Value field of the leaf node after being encoded.

Further, the node in the MPT state tree shown in FIG. 1 is finally stored in a database in the form of Key-Value pair.

When the node in the MPT state tree is stored in a database, Key in a key value pair of the node in the MPT state tree is a hash value of data content included in the node. Value in the key value pair of the node in the MPT state tree is data content included in the node.

That is, when the node in the MPT state tree is stored in the database, a hash value of data content included in the node can be calculated (that is, hash calculation is performed on the node as a whole), the calculated hash value is used as a key, and the data content included in the node is used as a value to generate a Key-Value pair. Then, the generated Key-Value pair is stored in the database.

The node in the MPT state tree is stored by using the hash value of the data content included in the node as Key and the data content included in the node as Value. Therefore, when the node in the MPT state tree needs to be queried, content addressing can be generally performed by using the hash value of the data content included in the node as Key. In terms of "content addressing", for some nodes with "duplicate content", "reusing" is usually performed to save storage space of data storage.

Figure 2:
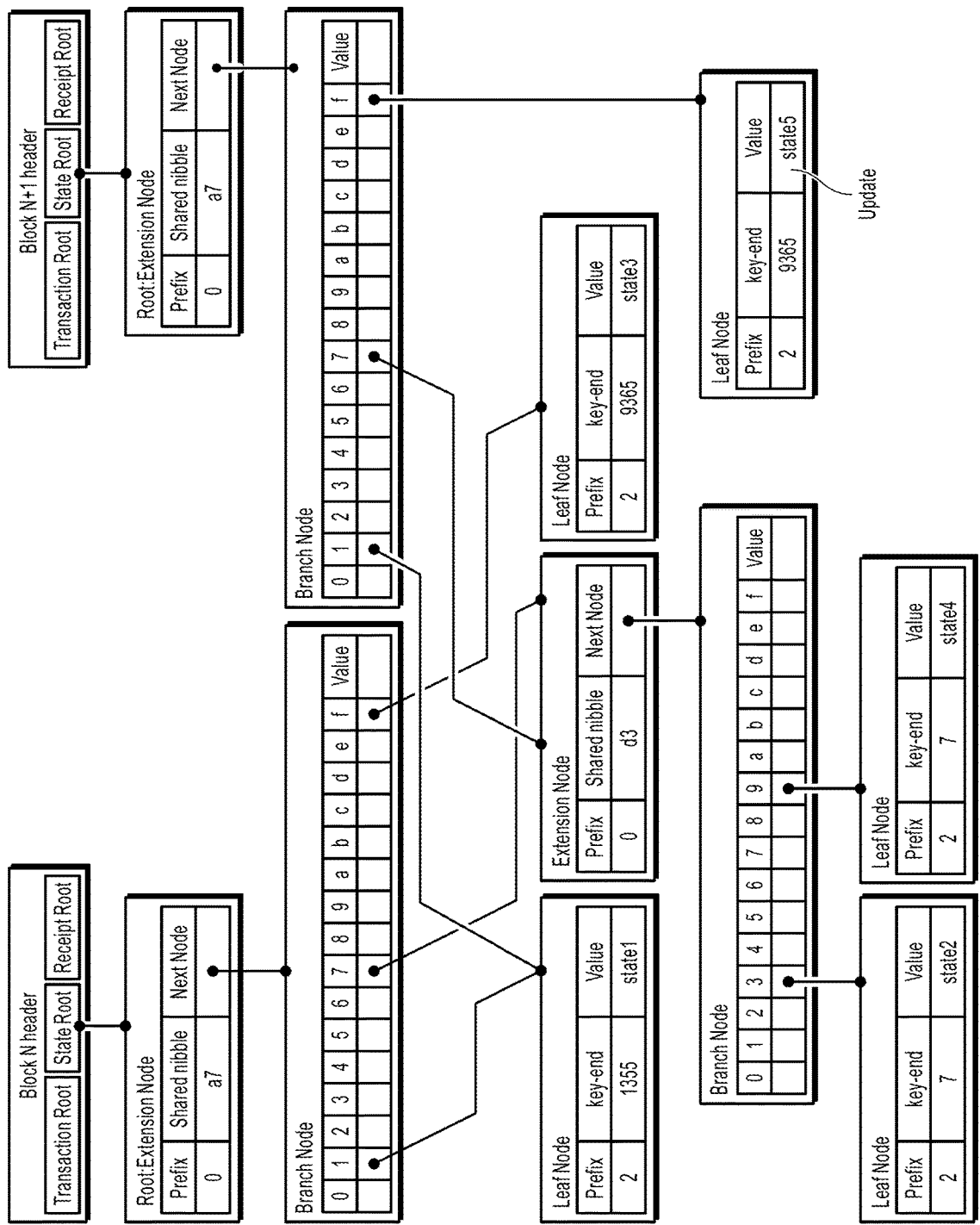
FIG. 2 is a schematic diagram illustrating node reusing in an MPT state tree, according to the present specification.

As shown in FIG. 2, FIG. 2 is a schematic diagram illustrating node reusing in an MPT state tree, according to the present specification. It is worthwhile to note that, in practice, after a transaction in a latest block generated by the blockchain is executed, account states of only some accounts can be changed. Therefore, when an MPT state tree is constructed, a complete MPT state tree does not need to be reconstructed based on current state data of all accounts in the blockchain, and only nodes corresponding to some accounts whose account states change need to be updated based on an MPT state tree corresponding to a previous block of the latest block. For nodes corresponding to accounts whose account states do not change on the MPT state tree, because no data update occurs on these nodes, corresponding nodes in the MPT state tree corresponding to the previous block of the latest block can be directly reused.

As shown in FIG. 2, assume that the account state data in Table 1 is the latest account states of all accounts in the blockchain after transaction execution in Block N is completed. The MPT state tree organized based on the account state data in Table 1 is still shown in FIG. 1.

Assume that after transaction execution in Block N+1 is completed, an account state at account address "a7f9365" in Table 1 is updated from "state3" to "state5". In such case, when Block N+1 updates the MPT state tree, it is not necessary to reconstruct an MPT state tree based on current state data of all accounts in the blockchain after transaction execution in Block N+1 is completed.

In such case, only Value in a leaf node whose "key-end" is "9365" in the MPT state tree (that is, the MPT state tree shown in FIG. 1) corresponding to Block N can be updated from "state3" to "state5", and hash indexes of all nodes on the path from the root node to the leaf node continue to be updated.

That is, when the leaf node in the MPT state tree is updated, because the hash value of the entire leaf node is updated, the hash indexes of all nodes on the path from the root node to the leaf node are also updated accordingly.

For example, refer back to FIG. 2. In addition to the value in the leaf node whose "key-end" is "9365", a hash index that is filled in the f field of a previous branch node of the leaf node and that points to the leaf node needs to be updated. Further, tracing back to the root node can further be performed, and a hash index that is filled in the "Next Node" field of a previous root node (Root Extension Node) of the branch node and that points to the branch node can be further updated.

Except the nodes that are updated above, for all nodes that are not updated, corresponding nodes in the MPT state tree of Block N can be directly reused.

The MPT tree corresponding to the Block N finally needs to be reserved as historical data. Therefore, when the MPT state tree is updated in Block N+1, the updated nodes are not directly modified and updated on the basis of the original nodes in the MPT state tree corresponding to Block N, but are recreated on an MPT tree corresponding to Block N+1. That is, in the MPT state tree corresponding to Block N+1, only a small number of nodes that are updated need to be created actually. For other nodes that are not updated, corresponding nodes in the MPT state tree corresponding to Block N can be directly reused.

For example, as shown in FIG. 2, in the MPT state tree corresponding to Block N+1, actually only one extension node serving as a root node, one branch node, and one leaf node need to be recreated. For nodes that are not updated, hash indexes pointing to the corresponding nodes in the MPT state tree corresponding to Block N can be added to these recreated nodes in the MPT state tree to complete "reusing" of the nodes. Nodes before the update in the MPT state tree corresponding to Block N are saved as historical account state data. For example, as shown in FIG. 2, the leaf node whose "key-end" is "9365" and value is "state3" will be saved as historical data.

In the previous example, a content update occurs on a small number of nodes in the MPT state tree of Block N+1, so most nodes of the previous block Block N can be "reused". In practice, new nodes can be added to the MPT state tree of Block N+1 compared with that of the previous block Block N. In such case, although the newly added nodes cannot be directly "reused" from the MPT tree of the previous block Block N, but can be "reused" from an MPT state tree of a much earlier block.

For example, the nodes added to the MPT state tree of Block N+1 do not appear on the MPT state tree of Block N, but can appear on an MPT state tree of a much earlier block. For example, the nodes appear in the MPT state tree of Block N−1. Therefore, for the nodes added to the MPT state tree of Block N+1, corresponding nodes in the MPT state tree of Block N−1 can be directly reused.

In practice, the smart contract function can be provided for public, private, and consortium blockchains. The smart contract on the blockchain is a contract that can be triggered by a transaction on the blockchain. The smart contract is defined in the form of codes.

Taking Ethereum as an example, users can create and invoke some complex logics in the Ethereum network. An Ethereum virtual machine (EVM) is the core of Ethereum, which is a programmable blockchain, and each Ethereum node can run the EVM. The EVM is a Turing-complete virtual machine, through which various complex logics can be implemented. The user broadcasts and invokes the smart contract actually on the EVM in the Ethereum. In fact, the EVM directly runs virtual machine codes (virtual machine bytecode, "bytecode" for short), so the smart contract deployed on the blockchain can be bytecodes.

Figure 3:
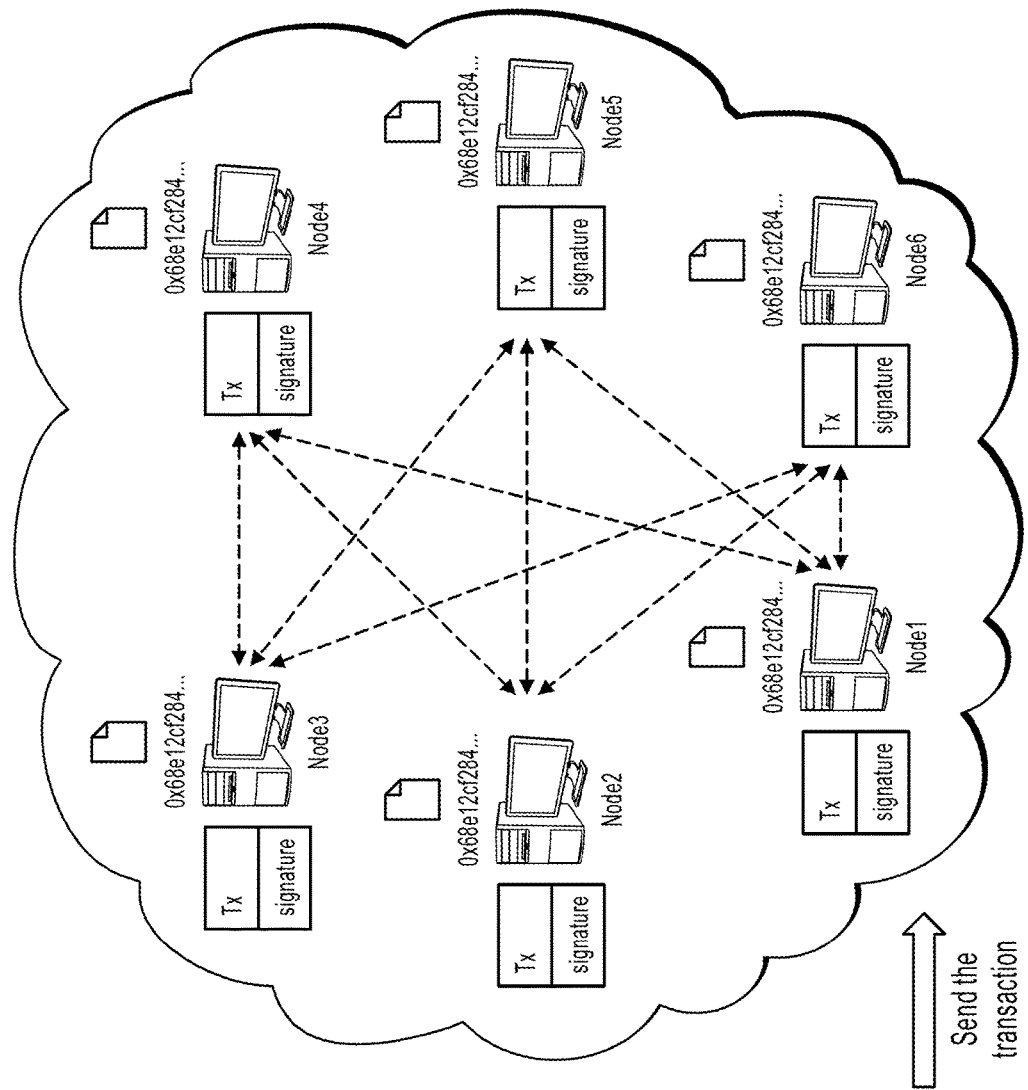
FIG. 3 is a schematic diagram illustrating a procedure for creating a smart contract, according to the present specification.
Figure 3:
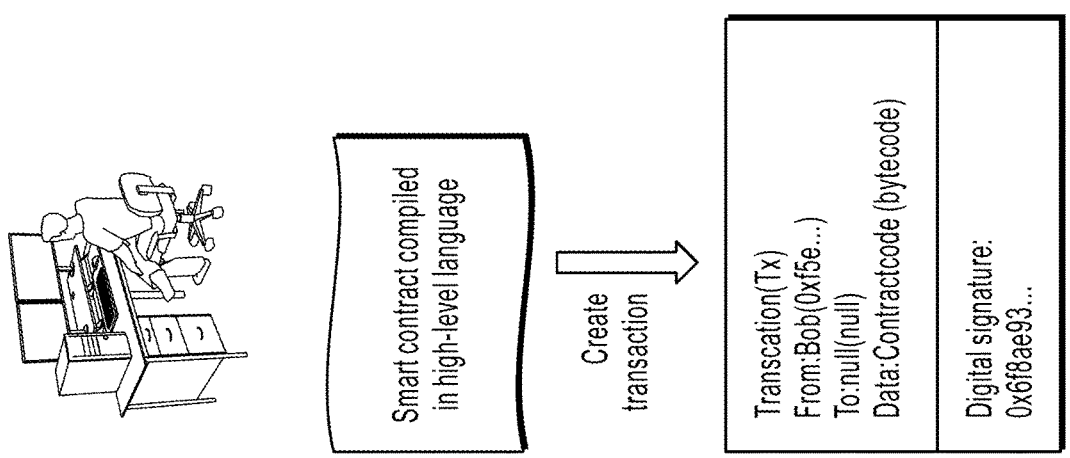

As shown in FIG. 3, after Bob sends a transaction containing information about creating a smart contract to the Ethereum network, each node can execute the transaction in the EVM. The From field of the transaction in FIG. 1 is used to record an address of an account that initiates the creating of the smart contract. Contract codes stored in a field value of the Data field of the transaction can be bytecodes, and a field value of the To field of the transaction is a null account. After a consensus is reached between nodes based on a consensus mechanism, the smart contract is successfully created. Subsequently, a user can invoke the smart contract.

After a smart contract is created, a contract account corresponding to the smart contract appears on the blockchain and has a specific address. For example, "0x68e12cf284 . . . " on each node in FIG. 1 represents the address of the created contract account. A contract code and account storage are stored in the account storage of the contract account. The behavior of the smart contract is controlled by the contract code, and the account storage of the smart contract keeps the contract status. In other words, the smart contract causes a virtual account including the contract codes and account storage to be generated on the blockchain.

As mentioned above, the Data field of the transaction containing information about creating a smart contract can store the bytecodes of the smart contract. The bytecode consists of a series of bytes. Each byte can identify one operation. Based on development efficiency, readability, etc., developers could not write bytecodes directly, but choose high-level languages to write smart contract codes. For example, the high-level languages can be Solidity, Serpent, LLL, etc. For smart contract codes compiled in high-level languages, bytecodes that can be deployed on the blockchain can be generated through compiling by a compiler.

The Solidity language is used as an example. Contract codes compiled by using the Solidity language are similar to the Class in an object-oriented programming language. Multiple members can be specified in a contract, including a status variable, a function, a function modifier, an event, etc. The status variable is a value that is permanently stored in the account storage field of the smart contract and is used to store the status of the contract.

Figure 4:
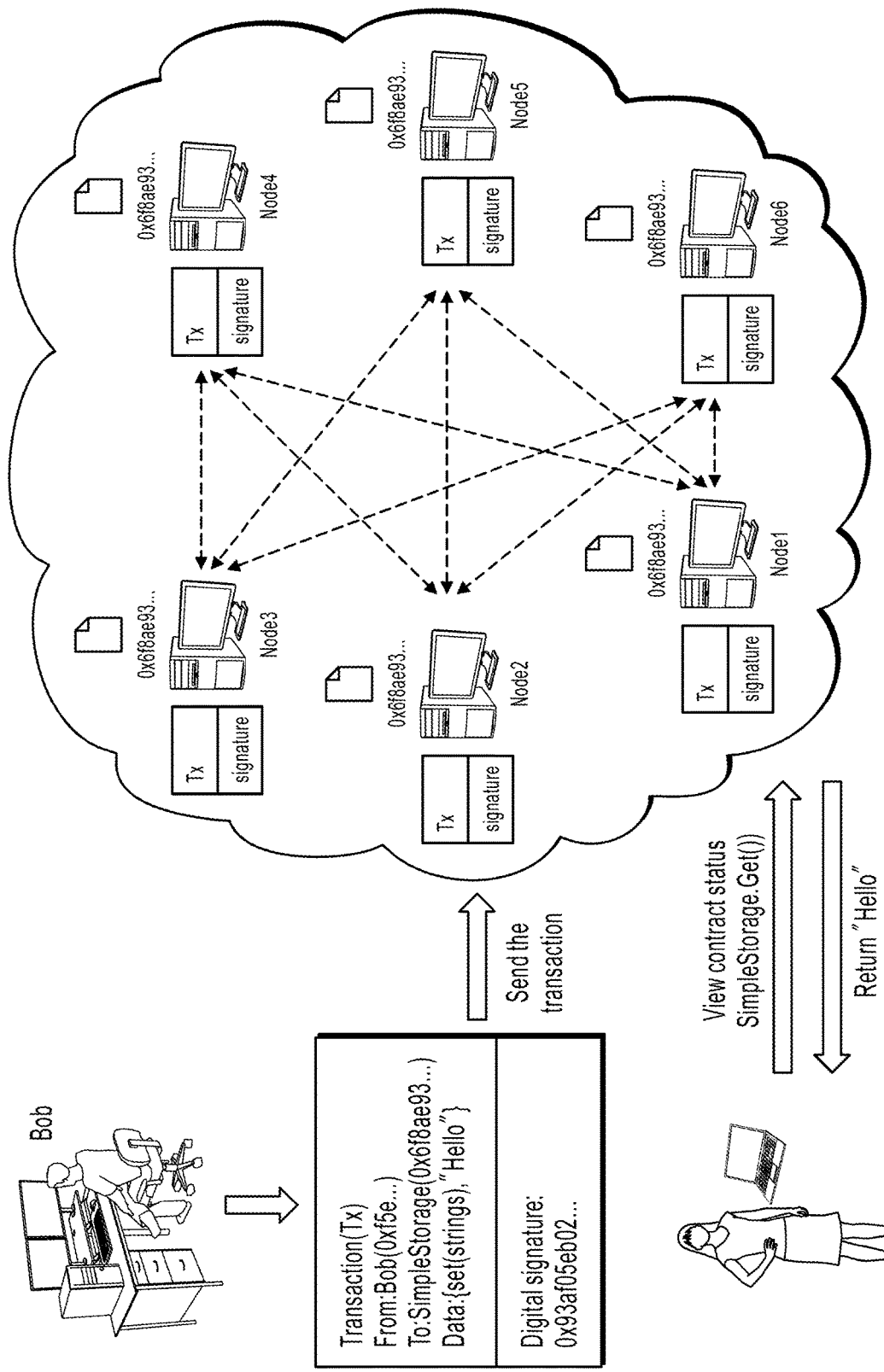
FIG. 4 is a schematic diagram illustrating a procedure for invoking a smart contract, according to the present specification.

As shown in FIG. 4, Ethereum is still used as an example. After Bob sends a transaction containing information about invoking a smart contract to the Ethereum network, each node can execute the transaction in the EVM. In FIG. 4, the From field of the transaction is used to record an address of an account that initiates the invoking of the smart contract, the To field is used to record an address of the invoked smart contract, and the Data field of the transaction is used to record a method and a parameter for invoking the smart contract. After the smart contract is invoked, the account status of the contract account can change. Subsequently, a certain client can view the account status of the contract account by using an accessed blockchain node (for example, node 1 in FIG. 4).

The smart contract can be executed independently on each node in the blockchain network in a specified method, and all execution records and data are stored in the blockchain. Therefore, after such a transaction is executed, transaction vouchers that cannot be tampered with and will not be lost are stored in the blockchain.

Figure 5:
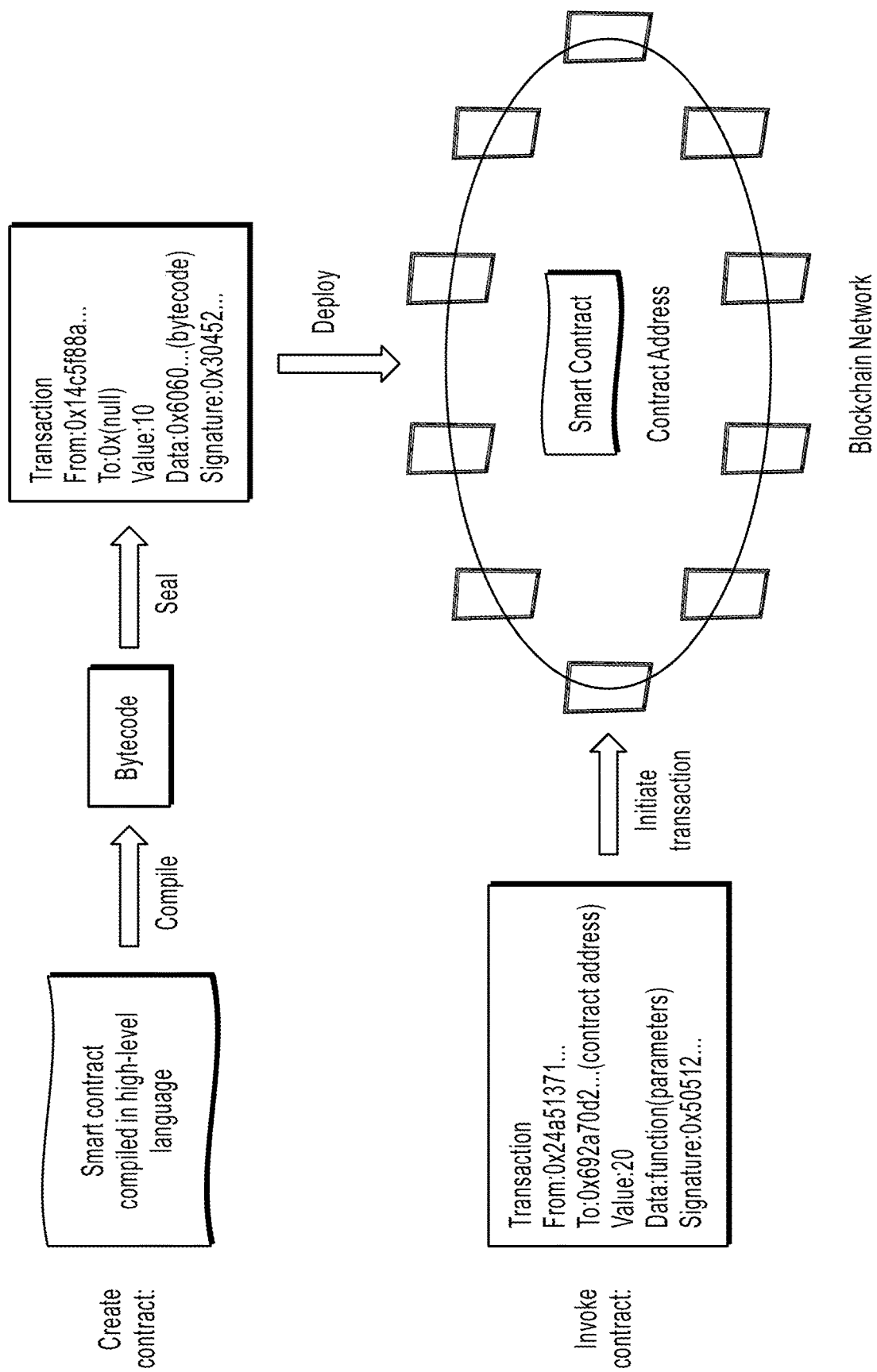
FIG. 5 is a schematic diagram illustrating a procedure for creating and invoking a smart contract, according to the present specification.

A schematic diagram of creating a smart contract and invoking a smart contract is shown in FIG. 5. Creating a smart contract in Ethereum requires the following processes: compiling the smart contract, changing the smart contract into bytecodes, and deploying the bytecodes to the blockchain. Invoking a smart contract in Ethereum means initiating a transaction pointing to a smart contract address. An EVM of each node can separately execute the transaction, and smart contract codes are distributed on a virtual machine of each node in the Ethereum network.

A conventional blockchain project represented by Ethereum usually supports the conversion of a real-world currency into a virtual token that can be circulated on the blockchain in order to realize "value transfer" on the blockchain.

In the blockchain field, for some blockchain projects (for example, Ant Blockchain) derived from an Ethereum-based architecture, a function of converting a real-world currency into a virtual token that can be circulated on the blockchain is usually not supported. Instead, in these blockchain projects, some non-monetary attribute physical assets in the real world can be converted into virtual assets that can be circulated on the blockchain.

It is worthwhile to note that converting the non-monetary attribute physical assets in the real world into the virtual assets on the blockchain generally refers to a process in which the physical assets are "anchored" with the virtual assets on the blockchain, and used as value support of these virtual assets, so as to generate, on the blockchain, the virtual assets that match the value of the physical assets and that can be circulated between blockchain accounts on the blockchain.

During implementation, account types supported by the blockchain can be extended. Based on the account types supported by the blockchain, an asset account (also referred to as an asset object) can be extended. For example, an asset account can be extended on the basis of the external account and the contract account supported by Ethereum. The extended asset account is a virtual asset that can use the real-word non-monetary attribute physical asset as the value support and that can be circulated between blockchain accounts.

For a user accessing such a blockchain, in addition to creating a user account and a smart contract on the blockchain, the user can create a virtual asset that matches the value of a real-world non-monetary attribute physical asset to circulate on the blockchain.

For example, the user can convert non-monetary attribute physical assets such as real estate, stocks, loan contracts, bills, and accounts receivable into value-matched virtual assets to circulate on the blockchain.

An account state of the previous asset account can also be specifically maintained by using a structural body. Content included in the structural body of the asset account can be the same as that in the Ethereum, or can be designed based on an actual requirement.

In an implementation, for example, the content included in the structural body of the asset account is the same as that in Ethereum. The structural body of the asset account can also include fields such as Balance, Nonce, Code, and Storage that are described above.

It is worthwhile to note that in Ethereum, the Balance field is usually used to maintain a current account balance. However, for a blockchain project derived from an Ethereum-based architecture, because the blockchain project cannot support converting a real-world currency into a virtual token that can be circulated on the blockchain, in such a blockchain, the meaning of the Balance field can be extended and the Balance field does not represent the "balance" of an account, but is used to maintain address information of an asset account corresponding to a "virtual asset" held in the account. In practice, the Balance field can maintain address information of asset accounts corresponding to multiple "virtual assets".

In such case, after address information of an asset account corresponding to a "virtual asset" to be held is added to the Balance field, the previous external account, contract account, and asset account can all hold the virtual asset. That is, in addition to the external account and the contract account, the asset account itself can hold virtual assets.

For the asset account, field values of the Nonce and Code fields can be null (or cannot be null). The field value of the Storage field may no longer be null. The Storage field can be used to maintain the asset state of the "virtual asset" corresponding to the asset account. A specific method of maintaining the asset state of the "virtual asset" corresponding to the asset account in the Storage field can be flexibly designed based on a requirement, and details are omitted here for simplicity.

In a blockchain project derived from an Ethereum-based architecture, the user can create a virtual asset on the blockchain that matches the value of a real-world non-monetary attribute physical asset through the following implementations:

In one implementation, the transaction types supported by the blockchain can be extended to obtain a transaction for creating a virtual asset. For example, transactions supported by Ethereum usually include a common transfer transaction, a transaction for creating a smart contract, and a transaction for invoking a smart contract. Based on the previous three types of transactions, a transaction for creating a virtual asset can be extended.

In such case, a user can broadcast a transaction for creating a virtual asset to a blockchain network via a client, and a node on the blockchain executes the transaction in a local EVM to create a virtual asset for the user. After nodes reach consensus based on a consensus mechanism, the virtual asset is successfully created, and an asset account corresponding to the virtual asset appears in the blockchain and has a specific address.

In another implementation, a smart contract for creating a virtual asset can also be deployed on the blockchain, and a process of deploying the smart contract for creating a virtual asset is not described again.

In such case, a user can broadcast a transaction for invoking the smart contract to a blockchain network via a client, and a node on the blockchain executes the transaction in a local EVM and runs a contract code related to the smart contract in the EVM to create a virtual asset for the user. After nodes reach consensus based on a consensus mechanism, the virtual asset is successfully created, and an asset account corresponding to the virtual asset appears in the blockchain and has a specific address.

Certainly, for some blockchain projects derived from an Ethereum-based architecture, if the blockchain projects also support the function of converting a real-world currency into a virtual token that can be circulated on the blockchain, some real-world non-monetary attribute physical assets can still be converted into virtual tokens that can be circulated on the blockchain. Details are omitted in the present specification.

In an inter-blockchain scenario, multiple blockchains can be interconnected by using inter-blockchain relays.

The inter-blockchain relay can separately interconnect with multiple blockchains by using bridging interfaces, and implement inter-blockchain data synchronization between the multiple blockchains based on an implemented data transport logic.

An inter-blockchain technology used to implement the previous inter-blockchain relay is not specifically limited in the present specification. For example, in practice, multiple blockchains can be connected by using an inter-blockchain mechanism such as a side chain technology or a notary technology.

After multiple blockchains are interconnected by using inter-blockchain relays, data on other blockchains can be read and authenticated between the blockchains, or smart contracts deployed on other blockchains can be invoked by using inter-blockchain relays.

In addition to using data stored in the blockchain, the smart contract deployed on the blockchain can also use the Oracle machine to reference data on a data entity off the chain, so as to implement data exchange between the smart contract and the real-world data entity. The off-chain data entity can include a centralized server or data center deployed off the chain, etc.

Different from inter-blockchain relays, the Oracle machine does not synchronize data on one blockchain to another blockchain, but synchronizes data on an off-chain data entity to the blockchain.

That is, the inter-blockchain relay is used to connect two blockchains, and the Oracle machine is used to connect a blockchain with an off-chain data entity to implement data exchange between the blockchain and the real world.

The present specification is intended to provide a technical solution for performing reimbursement processing on an electronic bill stored in a blockchain and maintaining a reimbursement state of the electronic bill.

During implementation, a node in the blockchain can first determine whether a maintained target electronic bill is in an unreimbursed state when monitoring a reimbursement transaction broadcasted by a reimbursement initiator for the target electronic bill to the blockchain.

If the target electronic bill is in the unreimbursed state, it can be considered that the target electronic bill has not been reimbursed, so the node on the blockchain can update the target electronic bill from the unreimbursed state to a reimbursement lock state. In addition, after the target electronic bill is updated to the reimbursement lock state, the node on the blockchain can instruct the reimbursement acceptor to perform reimbursement processing on the target electronic bill.

For example, the reimbursement acceptor can subscribe to a bill state of the target electronic bill maintained by the node. In such case, after updating the target electronic bill to the reimbursement lock state, the node can push the reimbursement lock state of the target electronic bill to the reimbursement acceptor, so as to trigger the reimbursement acceptor to perform reimbursement processing on the target electronic bill.

Subsequently, the node on the blockchain can determine whether a reimbursement result that is corresponding to the target electronic bill and that is broadcasted by the reimbursement acceptor to the blockchain is monitored.

If the reimbursement result is monitored, it can be considered that the reimbursement processing performed by the reimbursement acceptor on the target electronic bill is completed, so the node on the blockchain can update the maintained target electronic bill from the reimbursement lock state to a reimbursed state.

In addition, if the target electronic bill is in the reimbursement lock state, it can be considered that reimbursement processing for the target electronic bill is in progress. In such case, to avoid repeated reimbursement, the node on the blockchain may no longer perform subsequent processing on the reimbursement transaction, that is, does not need to instruct the reimbursement acceptor to perform reimbursement processing on the target electronic bill. In addition, the node on the blockchain can further notify the reimbursement initiator that reimbursement for the target electronic bill fails.

In the previous technical solution, the maintained electronic bill can be updated to the reimbursement lock state when the reimbursement transaction for the electronic bill in the unreimbursed state broadcasted by the reimbursement initiator to the blockchain is monitored, and after the electronic bill is updated to the reimbursement lock state, the reimbursement acceptor can further be instructed to perform reimbursement processing on the electronic bill. Subsequently, if the reimbursement result that is corresponding to the electronic bill and that is broadcasted by the reimbursement acceptor to the blockchain is monitored, the maintained electronic bill can be updated to the reimbursed state. As such, the electronic bill stored in the blockchain can be reimbursed. In addition, repeated reimbursement for the electronic bill can be avoided because subsequent processing cannot be performed on the reimbursement transaction of the electronic bill in the reimbursement lock state or reimbursed state.

Figure 6:
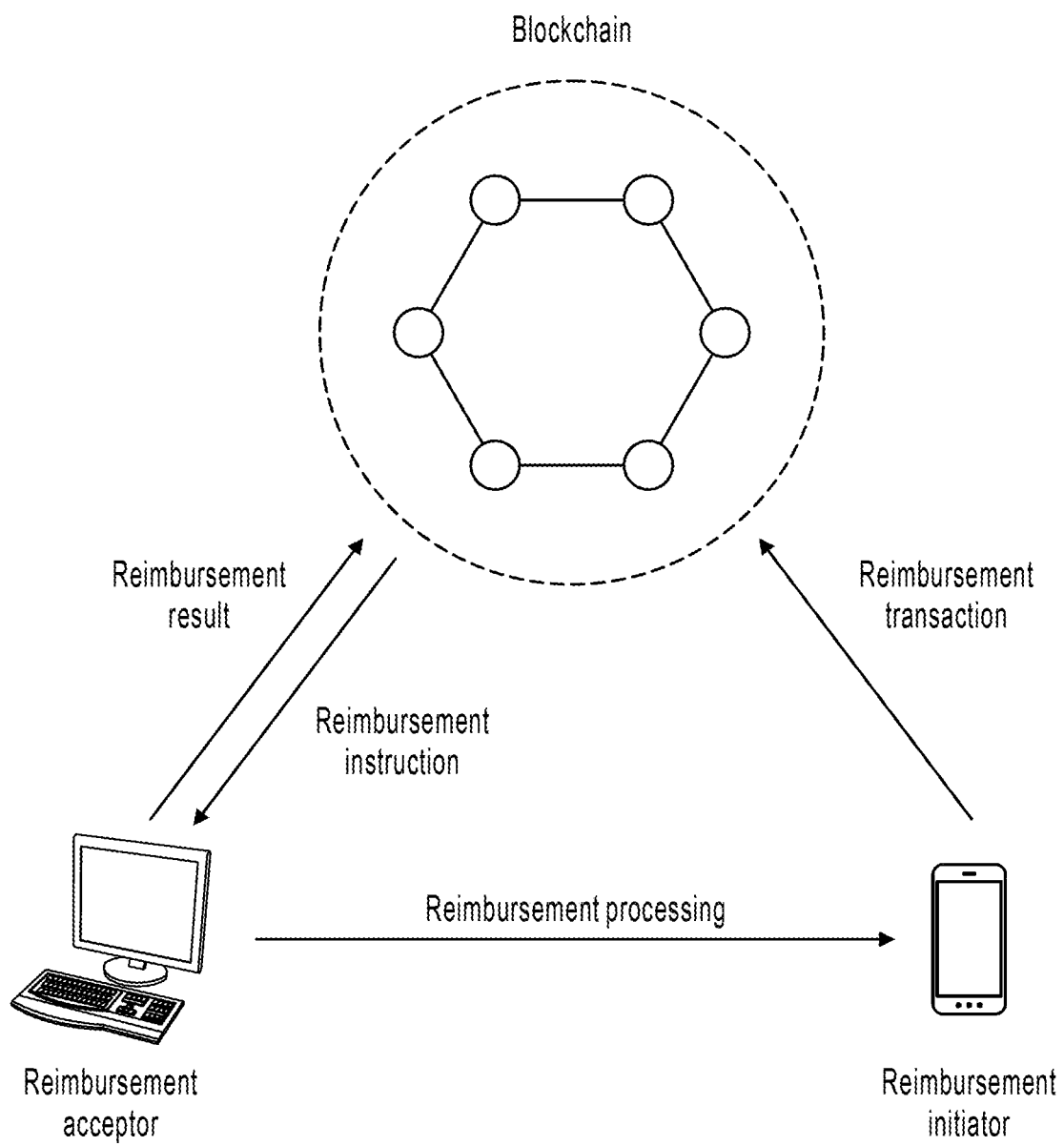
FIG. 6 is a schematic diagram illustrating a blockchain-based electronic bill reimbursement system, according to an example implementation of the present specification.

Referring to FIG. 6, FIG. 6 is a schematic diagram illustrating a blockchain-based electronic bill reimbursement system, according to an example implementation of the present specification.

In the blockchain-based electronic bill reimbursement system shown in FIG. 6, electronic bills can be stored in the blockchain.

For example, for a certain bill, after confirming that payment has been received, a payee of the bill can issue an electronic bill corresponding to the bill to a payer of the bill, and broadcast the electronic bill to the blockchain for storage.

For a certain electronic bill stored in the blockchain, a reimbursement initiator can initiate a reimbursement request against the electronic bill to a reimbursement acceptor, so the reimbursement acceptor performs reimbursement processing on the electronic bill.

For example, a payer of a bill (for example, a medical bill) corresponding to the electronic bill can act as a reimbursement initiator to initiate a reimbursement request for the electronic bill to an organization (for example, a medical insurance institution) of the payer that acts as a reimbursement acceptor, so the reimbursement acceptor pays the amount recorded in the electronic bill to the reimbursement initiator, thereby implementing reimbursement processing on the electronic bill.

Specifically, the reimbursement initiator can directly construct a reimbursement transaction for the electronic bill, and broadcast the reimbursement transaction to the blockchain for storage, so as to trigger the reimbursement acceptor to perform reimbursement processing on the electronic bill stored in the blockchain.

Or the reimbursement initiator can send a reimbursement request for the electronic bill to the reimbursement acceptor. When receiving the reimbursement request, the reimbursement acceptor can construct a reimbursement transaction for the electronic bill based on the reimbursement request, and broadcast the reimbursement transaction to the blockchain for storage, so as to further trigger the reimbursement acceptor to perform reimbursement processing on the electronic bill stored in the blockchain.

It is worthwhile to note that each node on the blockchain can maintain a bill state of each electronic bill stored in the blockchain. Because the bill state of the electronic bill can change, and data stored in the blockchain usually cannot be modified, the bill state of each electronic bill maintained by each node on the blockchain is stored locally on the node, and will not be broadcasted to the blockchain for storage.

Figure 7:
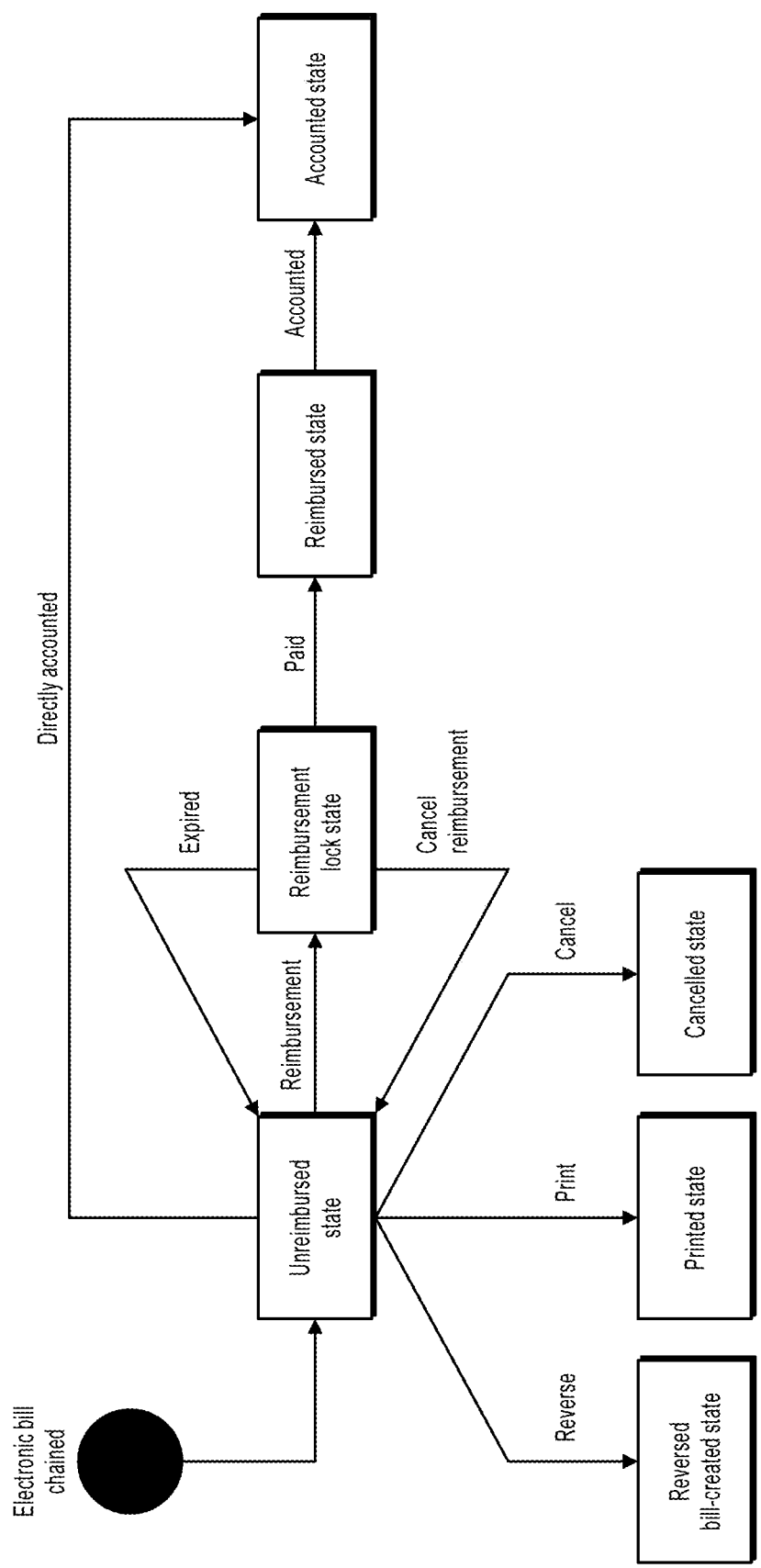
FIG. 7 is a schematic diagram illustrating a bill state update procedure of an electronic bill, according to an example implementation of the present specification.

Referring to FIG. 7, FIG. 7 is a schematic diagram illustrating a bill state update procedure of an electronic bill, according to an example implementation of the present specification.

As shown in FIG. 7, after issuing an electronic bill, a bill drawer or issuer can broadcast the electronic bill to a blockchain for storage. In such case, the electronic bill is in an unreimbursed state. When a bill-related party (referred to as a reimbursement initiator) such as a bill-using department initiates reimbursement processing on the electronic bill, the electronic bill can be updated from the unreimbursed state to a reimbursement lock state, so as to prevent another bill-using department from performing reimbursement processing on the electronic bill, thereby avoiding repeated reimbursement. When the reimbursement processing for the electronic bill is completed (for example, the amount recorded on the electronic bill is transferred to a specified account of the bill-using department), the electronic bill can be updated from the reimbursement lock state to a reimbursed state. When accounting processing for the electronic bill is completed (for example, the drawer or the drawee re-records the payer, payee, and amount recorded on the electronic bill in the ledger), the electronic bill can be updated from the reimbursed state to an accounted state.

In practice, the electronic bill can be directly accounted without performing reimbursement processing on the electronic bill. In such case, the electronic bill can be updated from the unreimbursed state to the accounted state.

After the electronic bill is updated to the reimbursement lock state, if a reimbursement result corresponding to the electronic bill broadcasted to the blockchain is not monitored within a period of time, the electronic bill can be updated from the reimbursement lock state to the unreimbursed state (that is, the "expiration" process in the figure). Similarly, if reimbursement verification on the electronic bill fails, the electronic bill can be updated from the reimbursement lock state to the unreimbursed state (that is, the "reimbursement cancellation" process in the figure).

In addition to performing reimbursement processing on the electronic bill in the unreimbursed state, the electronic bill can be reversed, printed (for example, printed by using a fiscal blank note), cancelled, etc. In such case, the electronic bill can be correspondingly updated to a reversed bill-created state, a printed state, or a cancelled state.

In practice, the unreimbursed state, the reimbursement lock state, the reimbursed state, and the accounted state can be considered as valid states of electronic bills. The reversed bill-created state, the printed state, and the cancelled stated are considered as invalid states of electronic bills. For an electronic bill in an invalid state, no action can be taken on the electronic bill.

In addition, the bill-related party can send a bill state subscription request to a node on the blockchain. For example, the bill state subscription request can be sent to the node by using a client connected to the node, so as to subscribe to the bill state of the electronic bill maintained by the node.

After the bill-related party subscribes to a bill state of a certain electronic bill maintained by the node on the blockchain, if the bill state of the electronic bill is updated, the node can actively push the updated bill state of the electronic bill to the bill-related party.

Figure 8:
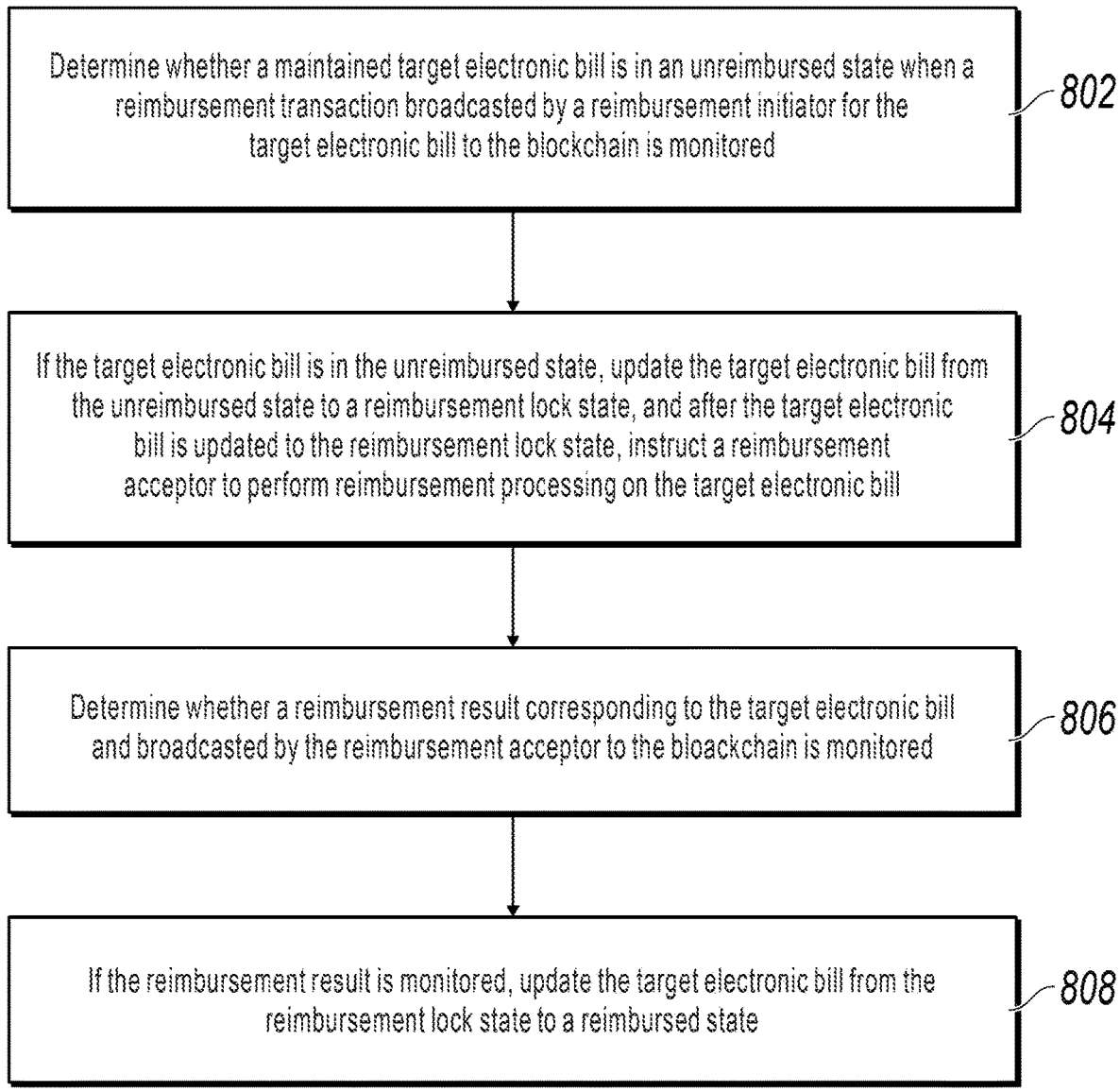
FIG. 8 is a flowchart illustrating a blockchain-based electronic bill reimbursement method, according to an example implementation of the present specification.

Referring to FIG. 8, FIG. 8 is a flowchart illustrating a blockchain-based electronic bill reimbursement method, according to an example implementation of the present specification. The method can be applied to an electronic device added to a blockchain as a node in the blockchain-based electronic bill reimbursement system shown in FIG. 6. The electronic device can be a server, a computer, a mobile phone, a tablet device, a notebook computer, a personal digital assistant (PDA), etc. This is not limited in the present specification. The method can include the following steps:

Step 802: Determine whether a maintained target electronic bill is in an unreimbursed state when a reimbursement transaction broadcasted by a reimbursement initiator for the target electronic bill to the blockchain is monitored.

Step 804: If the target electronic bill is in the unreimbursed state, update the target electronic bill from the unreimbursed state to a reimbursement lock state, and after the target electronic bill is updated to the reimbursement lock state, instruct a reimbursement acceptor to perform reimbursement processing on the target electronic bill.

Step 806: Determine whether a reimbursement result corresponding to the target electronic bill and broadcasted by the reimbursement acceptor to the blockchain is monitored.

Step 808: If the reimbursement result is monitored, update the target electronic bill from the reimbursement lock state to a reimbursed state.

The following uses an MPT tree data structure to organize account state data in a blockchain into an MPT state tree as an example to describe the technical solutions in the present specification in detail.

It should be emphasized that using the MPT tree data structure to organize the account state data in the blockchain is merely an example.

In practice, for a blockchain project derived from an Ethereum architecture, in addition to an improved Merkle tree such as an MPT tree, a Merkle tree variant, similar to an MPT tree, that incorporates a Trie dictionary tree can also be used. This is not listed in the present specification.

For a certain electronic bill (referred to as a target electronic bill) stored in the blockchain, if a reimbursement initiator needs to reimburse the target electronic bill to a reimbursement acceptor, the reimbursement initiator can directly construct a reimbursement transaction for the target electronic bill and broadcast the reimbursement transaction to the blockchain for storage. Or the reimbursement initiator can send a reimbursement request for the target electronic bill to the reimbursement acceptor, so the reimbursement acceptor constructs a reimbursement transaction for the electronic bill based on the reimbursement request, and broadcasts the reimbursement transaction to the blockchain for storage. For a process of broadcasting the reimbursement transaction to the blockchain for storage, refer to the previous process of persistently storing real data generated in the physical world in the blockchain. Details are omitted here for simplicity.

The node on the blockchain can monitor data stored in the blockchain, so as to monitor the reimbursement transaction. When monitoring the reimbursement transaction, the node on the blockchain can first determine whether the maintained target electronic bill is in an unreimbursed state.

In practice, for a certain electronic bill stored in the blockchain, the node on the blockchain can maintain a bill state of the electronic bill by maintaining a correspondence between an identifier of the electronic bill (for example, an electronic bill number) and a state.

In such case, data in the reimbursement transaction can include the identifier of the target electronic bill. When the node on the blockchain monitors the reimbursement transaction, the node can find, as the bill state of the target electronic bill based on the identifier of the target electronic bill in the reimbursement transaction, the bill state corresponding to the identifier of the target electronic bill in the maintained correspondence between the identifier of the electronic bill and the state.

For example, a bill state of each electronic bill stored in the blockchain and maintained by each node on the blockchain can be shown in Table 1 below:

TABLE 1

| Electronic bill | State |
|---|---|
| Electronic bill 1 | Reimbursement lock |
| Electronic bill 2 | Reimbursed |
| Electronic bill 3 | Unreimbursed |
| ... | ... |

As shown in Table 1, the node on the blockchain can determine that electronic bill 1 is in a reimbursement lock state when monitoring that reimbursement initiator 1 initiates reimbursement transaction 1 for electronic bill 1. When monitoring reimbursement transaction 2 of reimbursement initiator 2 for electronic bill 2, the node on the blockchain can determine that electronic bill 2 is in a reimbursed state. When monitoring reimbursement transaction 3 of reimbursement initiator 3 for electronic bill 3, the node on the blockchain can determine that electronic bill 3 is in an unreimbursed state.

If the node on the blockchain determines that the target electronic bill is in the unreimbursed state, it can be considered that reimbursement processing has not been performed on the target electronic bill. Therefore, the node on the blockchain can update the maintained target electronic bill from the unreimbursed state to the reimbursement lock state.

It is worthwhile to note that, because each node on the blockchain can monitor the reimbursement transaction, each node on the blockchain can update, when determining that the target electronic bill is in the unreimbursed state, the target electronic bill maintained by the node on the blockchain from the unreimbursed state to the reimbursement lock state.

For an electronic bill in the reimbursement lock state, it can be considered that reimbursement processing is being performed on the electronic bill. Therefore, when monitoring a reimbursement transaction for the electronic bill, the node on the blockchain can no longer process the reimbursement transaction, so as to avoid repeated reimbursement. In addition, the node on the blockchain can send, to the reimbursement initiator, a notification message used to indicate a reimbursement failure of the target electronic bill, so as to notify the reimbursement initiator that reimbursement processing for the electronic bill is in progress.

For an electronic bill in the reimbursed state, it can be considered that reimbursement processing on the electronic bill is completed. Therefore, when monitoring a reimbursement transaction for the electronic bill, the node on the blockchain can no longer process the reimbursement transaction, but can send a notification message to the reimbursement initiator, so as to notify the reimbursement initiator that reimbursement processing on the electronic bill is completed.

Table 1 is still used as an example. When the node on the blockchain monitors reimbursement transaction 1 of reimbursement initiator 1 for electronic bill 1, because it can be determined that electronic bill 1 is in the reimbursement lock state, the node on the blockchain can no longer process reimbursement transaction 1, but can send a notification message used to indicate a reimbursement failure of electronic bill 1 to reimbursement initiator 1, so as to notify reimbursement initiator 1 that reimbursement processing is being performed on electronic bill 1.

When the node on the blockchain monitors reimbursement transaction 2 of reimbursement initiator 2 for electronic bill 2, because it can be determined that electronic bill 2 is in the reimbursed state, the node on the blockchain can no longer process reimbursement transaction 2, but can send a notification message to reimbursement initiator 2, so as to notify reimbursement initiator 2 that reimbursement processing on electronic bill 2 is completed.

When the node on the blockchain monitors reimbursement transaction 3 of reimbursement initiator 3 for electronic bill 3, because it can be determined that electronic bill 3 is in the unreimbursed state, the node on the blockchain can update electronic bill 3 from the unreimbursed state to the reimbursement lock state.

In practice, because each node on the blockchain can monitor reimbursement transaction 3, each node on the blockchain can update a bill state of each electronic bill stored in the blockchain and maintained by the node on the blockchain to the following as shown in Table 2:

TABLE 2

| Electronic bill | State |
| --- | --- |
| Electronic bill 1 | Reimbursement lock |
| Electronic bill 2 | Reimbursed |
| Electronic bill 3 | Reimbursement lock |
| . . . | . . . |

Further, after updating the target electronic bill to the reimbursement lock state, the node on the blockchain can instruct the reimbursement acceptor to perform reimbursement processing on the target electronic bill.

The reimbursement acceptor can subscribe, to the node on the blockchain, to the bill state of the target electronic bill maintained by the node on the blockchain. In such case, after updating the target electronic bill to the reimbursement lock state, the node can push the reimbursement lock state of the target electronic bill to the reimbursement acceptor who subscribes to the bill state of the target electronic bill, so as to trigger the reimbursement acceptor to perform reimbursement processing on the target electronic bill in the reimbursement lock state. That is, the reimbursement acceptor can perform reimbursement processing on the target electronic bill after receiving the reimbursement lock state of the target electronic bill pushed by the node. For example, the reimbursement acceptor can receive, by using a client connected to the node, the reimbursement lock state of the target electronic bill pushed by the node, and perform reimbursement processing on the target electronic bill by using the client.

Or, after updating the target electronic bill to the reimbursement lock state, the node can directly send, to the reimbursement acceptor, a notification message used to instruct to perform reimbursement processing on the target electronic bill, so as to instruct the reimbursement acceptor to perform reimbursement processing on the target electronic bill. That is, after receiving the notification message sent by the node, the reimbursement acceptor can perform reimbursement processing on the target electronic bill.

In an implementation, when the node on the blockchain monitors the reimbursement transaction, the node can first determine whether the target electronic bill satisfies reimbursement criteria. If the target electronic bill satisfies the reimbursement criteria, the node further determines whether the maintained target electronic bill is in the unreimbursed state.

If the target electronic bill satisfies the reimbursement criteria, the node can further determine whether the maintained target electronic bill is in the unreimbursed state. Accordingly, if the target electronic bill does not satisfy the reimbursement criteria, subsequent operations may no longer be performed. As such, subsequent reimbursement processing can be avoided for an electronic bill that does not satisfy the reimbursement criteria, thereby improving efficiency and security of electronic bill reimbursement.

Specifically, when the reimbursement transaction is broadcasted to the blockchain for storage, the node on the blockchain can receive the reimbursement transaction, and perform consensus processing on the reimbursement transaction. After a consensus is reached, the node on the blockchain can seal the reimbursement transaction into a block, and persistently stores the reimbursement transaction in the blockchain.

For the reimbursement transaction sealed into the block, the node on the blockchain can execute the reimbursement transaction, that is, invoke, in response to the reimbursement transaction, a reimbursement verification logic specified in a smart contract deployed on the blockchain to perform reimbursement verification on the target electronic bill, that is, determine whether the target electronic bill satisfies the reimbursement criteria.

The reimbursement verification logic may be specifically program codes (for example, some program methods or functions that can be invoked) specified in the smart contract and related to the execution logic for performing reimbursement verification on the electronic bill. For a procedure for creating and invoking the smart contract, refer to the previous procedure for creating and invoking the smart contract. Details are omitted here for simplicity.

If the target electronic bill satisfies the reimbursement criteria, that is, reimbursement verification on the target electronic bill succeeds, the smart contract can generate a verification success event corresponding to the target electronic bill. When the node monitors the verification success event, the node can further determine whether the maintained target electronic bill is in the unreimbursed state. Therefore, when the target electronic bill is in the unreimbursed state, the node can update the target electronic bill from the unreimbursed state to the reimbursement lock state, and after updating the target electronic bill to the reimbursement lock state, instruct the reimbursement acceptor to perform reimbursement processing on the target electronic bill.

In practice, after generating the verification success event, the smart contract can store the verification success event in a transaction log corresponding to the reimbursement transaction. The node can perform log monitoring, so the verification success event stored in the transaction log corresponding to the reimbursement transaction can be monitored. When monitoring the verification success event, the node can further determine whether the maintained target electronic bill is in the unreimbursed state.

In an implementation, the reimbursement criteria for the electronic bill can include, for example, reimbursement permission criteria, reimbursement amount criteria, and reimbursement duration criteria.

The reimbursement permission criteria for the target electronic bill may be that the reimbursement initiator (that is, a user initiating reimbursement processing for the target electronic bill) has the reimbursement permission for the target electronic bill, for example, whether the reimbursement initiator is a payer recorded in the target electronic bill, or whether the reimbursement initiator is an employee of the reimbursement acceptor.

For example, the data in the reimbursement transaction can include a user identifier (for example, a taxpayer registration number) of the reimbursement initiator. The node on the blockchain can first determine a user identifier of a payer recorded in the target electronic bill, and then compare whether the two user identifiers are consistent. If the two user identifiers are consistent, the node on the blockchain can determine that the reimbursement initiator is the payer recorded in the target electronic bill, and can determine that the target electronic bill satisfies the reimbursement permission criteria.

The reimbursement amount criteria for the target electronic bill may be that an amount recorded in the target electronic bill is less than a remaining reimbursement amount of the previous reimbursement initiator.

For example, the node on the blockchain can locally maintain the remaining reimbursement amount of the reimbursement initiator. Assume that the remaining reimbursement amount of the reimbursement initiator is RMB 10,000. In such case, the node on the blockchain can determine whether the amount recorded in the target electronic bill is less than the remaining reimbursement amount of the reimbursement initiator. Assume that the amount recorded in the target electronic bill is 1,000, and is less than the remaining reimbursement amount of the maintained reimbursement initiator. Therefore, the node on the blockchain can determine that the target electronic bill satisfies the reimbursement amount criteria. In addition, the node on the blockchain can update the remaining reimbursement amount of the maintained reimbursement initiator to RMB 9,000 for subsequent reimbursement amount verification.

The reimbursement duration criteria for the target electronic bill may be that a time interval between an issuing moment recorded in the target electronic bill and the time point at which the reimbursement transaction is monitored is less than a time interval within which reimbursement is allowed. The time interval within which reimbursement is allowed can be predetermined by a bill manager.

For example, the node on the blockchain can locally maintain a predetermined time interval within which reimbursement is allowed, assume that the time interval within which reimbursement is allowed is 72 hours. In such case, the node on the blockchain can determine whether a time interval between the issuing moment recorded in the target electronic bill and the time point at which the reimbursement transaction is monitored is less than the time interval within which reimbursement is allowed. Assume that the issuing moment recorded in the target electronic bill is 15:00 on May 31st, a moment at which the node on the blockchain monitors the reimbursement transaction is 20:00 on June 1st, and a time interval between the two is 29 hours and is less than the time interval within which reimbursement is allowed. Therefore, the node on the blockchain can determine that the target electronic bill satisfies the reimbursement duration criteria.

In addition, after completing the reimbursement processing on the target electronic bill, the reimbursement acceptor can broadcast a reimbursement result corresponding to the target electronic bill to the blockchain for storage. For a process of broadcasting the reimbursement result to the blockchain for storage, refer to the previous process of persistently storing real data generated in the physical world in the blockchain. Details are omitted here for simplicity.

Because the node on the blockchain can monitor the data stored in the blockchain, the node on the blockchain can determine whether the previous reimbursement result is monitored.

If monitoring the reimbursement result, the node on the blockchain can consider that the reimbursement processing on the target electronic bill is completed, so the node on the blockchain can update the maintained target electronic bill from the reimbursement lock state to the reimbursed state.

However, if the node on the blockchain does not monitor the reimbursement result with predetermined duration, the node on the blockchain can consider that the reimbursement processing on the target electronic bill fails, so the node on the blockchain can update the maintained target electronic bill from the reimbursement lock state to the unreimbursed state. The predetermined duration can be predetermined by a technician, or can be a default value of a system, and is not limited in the present specification.

In practice, the data in the reimbursement result can include the identifier of the target electronic bill. When the node on the blockchain monitors the reimbursement result, the node can update, based on the identifier of the target electronic bill in the reimbursement result, the bill state corresponding to the identifier of the target electronic bill in the maintained correspondence between the identifier of the electronic bill and the state from the reimbursement lock state to the reimbursed state.

However, if the node on the blockchain does not monitor, within the predetermined duration, the reimbursement result where the electronic bill identifier is the identifier of the target electronic bill, the node on the blockchain can restore the bill state corresponding to the identifier of the target electronic bill to the unreimbursed state from the reimbursement lock state in the maintained correspondence between the identifier of the electronic bill and the state.

Table 1 is still used as an example. When the node on the blockchain monitors reimbursement transaction 3 of reimbursement initiator 3 for electronic bill 3, the maintained electronic bill 3 can be updated from the unreimbursed state to the reimbursement lock state. After updating electronic bill 3 to the reimbursement lock state, the node on the blockchain can instruct reimbursement acceptor 3 corresponding to electronic bill 3 to perform reimbursement processing on electronic bill 3.

After completing the reimbursement processing on electronic bill 3, the node on the blockchain can broadcast reimbursement result 3 corresponding to electronic bill 3 to the blockchain for storage.

In practice, because each node on the blockchain can monitor reimbursement result 3, each node on the blockchain can update a bill state of each electronic bill stored in the blockchain and maintained by the node on the blockchain to the following as shown in Table 3:

TABLE 3

| Electronic bill | State |
| --- | --- |
| Electronic bill 1 | Reimbursement lock |
| Electronic bill 2 | Reimbursed |
| Electronic bill 3 | Reimbursed |
| ... | ... |

That is, each node on the blockchain can update the maintained electronic bill 3 from the reimbursement lock state to the reimbursed state.

Table 1 is still used as an example. After updating electronic bill 1 to the reimbursement lock state, the node on the blockchain can instruct reimbursement acceptor 1 corresponding to electronic bill 1 to perform reimbursement processing on electronic bill 1.

Assume that reimbursement processing performed by reimbursement acceptor 1 on electronic bill 1 fails, in such case, reimbursement acceptor 1 will not broadcast the reimbursement result corresponding to electronic bill 1 to the blockchain.

In practice, because each node on the blockchain cannot monitor the reimbursement result corresponding to electronic bill 1 within the predetermined duration, each node on the blockchain can update a bill state of each electronic bill stored in the blockchain and maintained by each node on the blockchain to the following as shown in Table 4:

TABLE 4

| Electronic bill | State |
| --- | --- |
| Electronic bill 1 | Unreimbursed |
| Electronic bill 2 | Reimbursed |
| Electronic bill 3 | Reimbursed |
| . . . | . . . |

That is, each node on the blockchain can restore the maintained electronic bill 1 from the reimbursement lock state to the unreimbursed state.

In the previous technical solution, the maintained electronic bill can be updated to the reimbursement lock state when the reimbursement transaction for the electronic bill in the unreimbursed state broadcasted by the reimbursement initiator to the blockchain is monitored, and after the electronic bill is updated to the reimbursement lock state, the reimbursement acceptor can further be instructed to perform reimbursement processing on the electronic bill. Subsequently, if the reimbursement result that is corresponding to the electronic bill and that is broadcasted by the reimbursement acceptor to the blockchain is monitored, the maintained electronic bill can be updated to the reimbursed state. As such, the electronic bill stored in the blockchain can be reimbursed. In addition, repeated reimbursement for the electronic bill can be avoided because subsequent processing cannot be performed on the reimbursement transaction of the electronic bill in the reimbursement lock state or reimbursed state.

Corresponding to the previous implementation of the blockchain-based electronic bill reimbursement method, the present specification further provides an implementation of a blockchain-based electronic bill reimbursement apparatus.

The implementation of the blockchain-based electronic bill reimbursement apparatus in the present specification can be applied to an electronic device. The apparatus implementation can be implemented by software, hardware, or a combination of hardware and software. Software implementation is used as an example. As a logical device, the device is formed by reading a corresponding computer program instruction in a non-volatile memory to a memory by a processor of an electronic device where the device is located.

Figure 9:
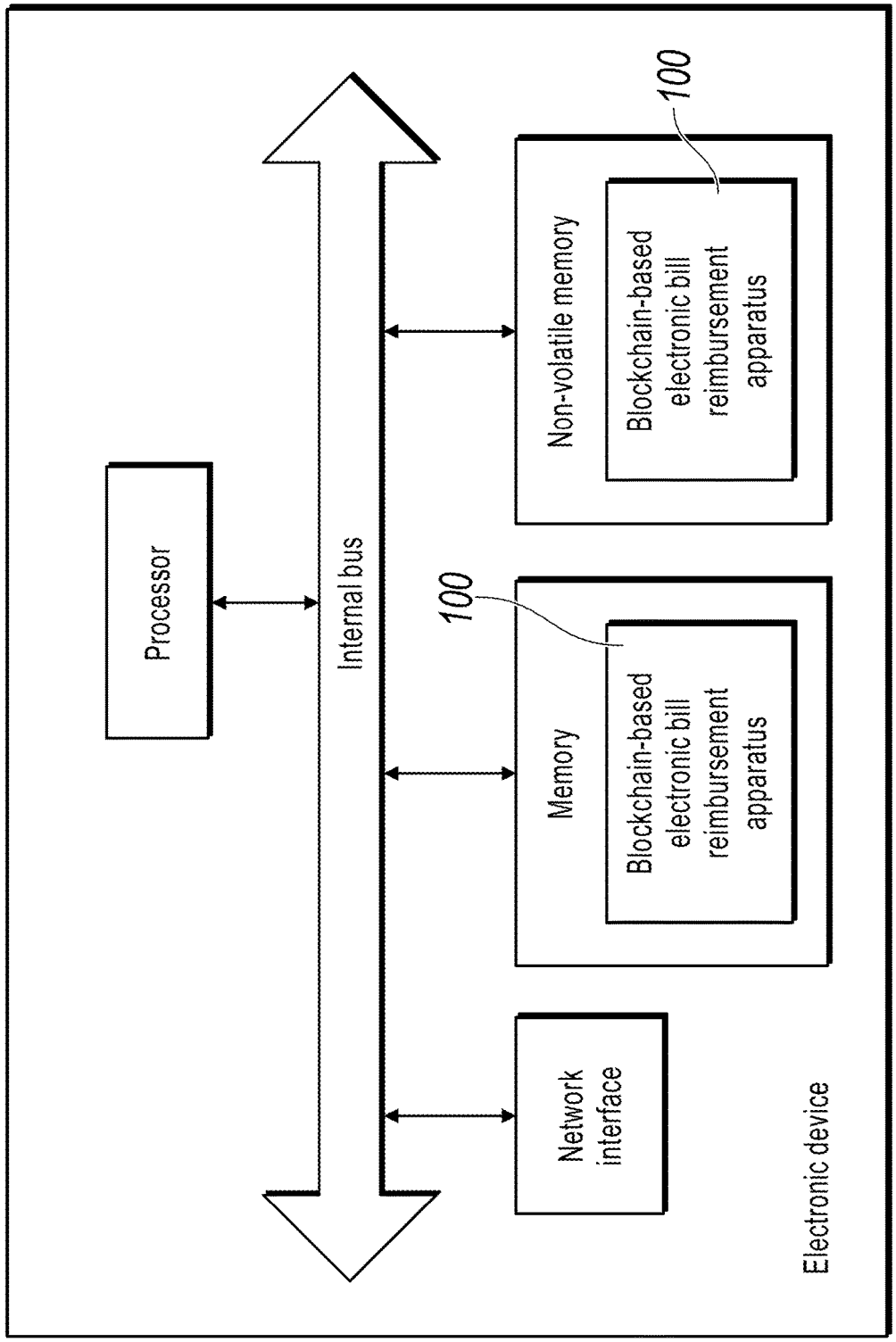
FIG. 9 is a schematic structural diagram illustrating an electronic device, according to an example implementation of the present specification.

In terms of hardware, referring to FIG. 9, FIG. 9 is a hardware structural diagram illustrating an electronic device where the blockchain-based electronic bill reimbursement apparatus is located in the present specification. In addition to a processor, a memory, a network interface, and anonvolatile memory shown in FIG. 9, the electronic device where the apparatus is located in the implementation can usually include other hardware based on an actual function of blockchain-based electronic bill reimbursement. Details are omitted here for simplicity.

Figure 10:
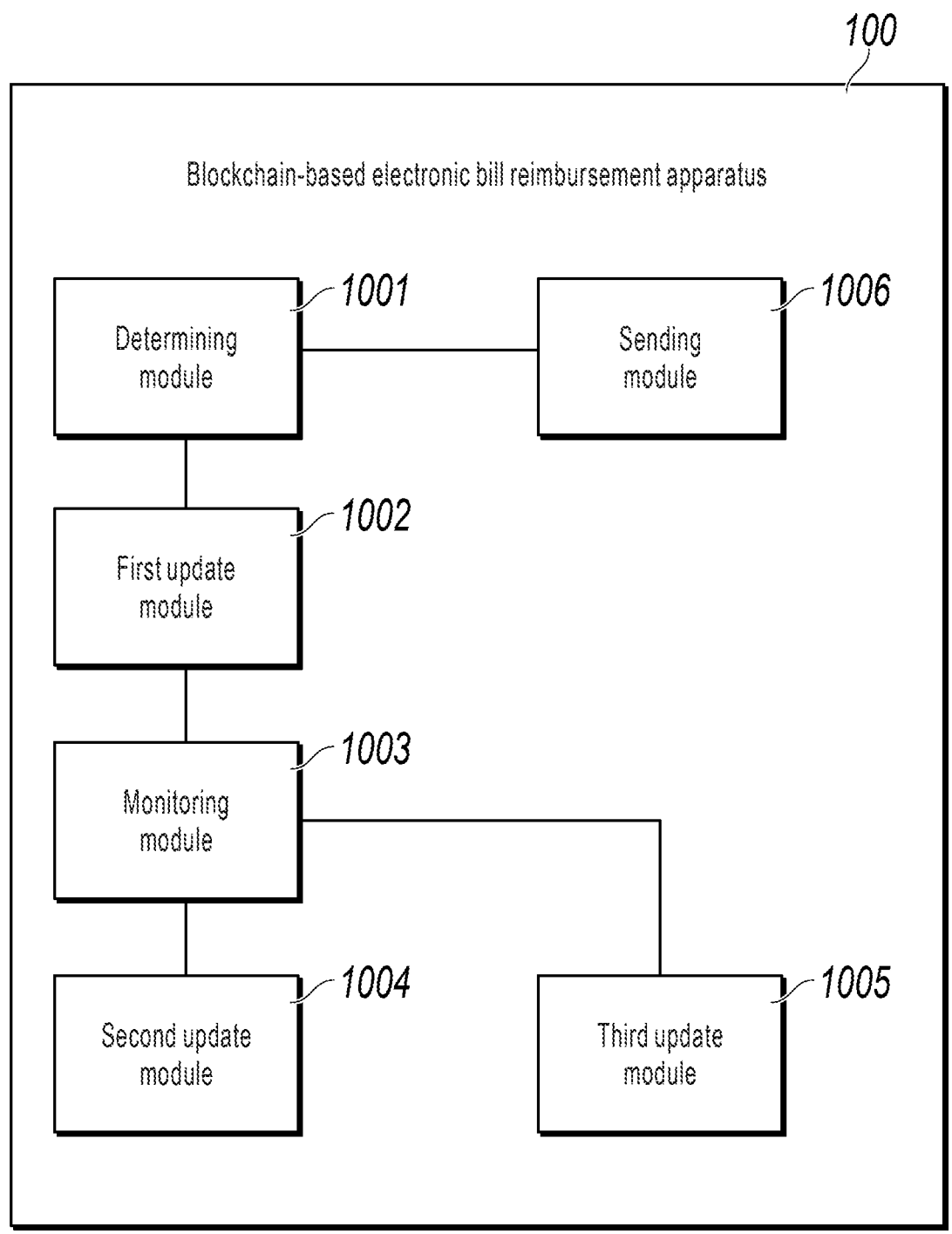
FIG. 10 is a block diagram illustrating a blockchain-based electronic bill reimbursement apparatus, according to an example implementation of the present specification.

Referring to FIG. 10, FIG. 10 is a block diagram illustrating a blockchain-based electronic bill reimbursement apparatus, according to an example implementation of the present specification. The apparatus 100 can be applied to the electronic device shown in FIG. 9, and the electronic device can be added to the blockchain as a node. The blockchain stores electronic bills. The apparatus 100 can include: a determining module 1001, configured to determine whether a maintained target electronic bill is in an unreimbursed state when a reimbursement transaction broadcasted by a reimbursement initiator for the target electronic bill to the blockchain is monitored; a first update module 1002, configured to: if the target electronic bill is in the unreimbursed state, update the target electronic bill from the unreimbursed state to a reimbursement lock state, and after the target electronic bill is updated to the reimbursement lock state, instruct a reimbursement acceptor to perform reimbursement processing on the target electronic bill; a monitoring module 1003, configured to determine whether a reimbursement result corresponding to the target electronic bill and broadcasted by the reimbursement acceptor to the blockchain is monitored; and a second update module 1004, configured to: if the reimbursement result is monitored, update the target electronic bill from the reimbursement lock state to a reimbursed state.

In the implementation, the determining module 1001 can be configured to: invoke, in response to the reimbursement transaction, a reimbursement verification logic specified in a smart contract deployed on the blockchain to perform reimbursement verification on the reimbursement initiator; and determine, in response to a monitored verification success event generated by the smart contract and corresponding to the reimbursement initiator, whether the maintained target electronic bill is in the unreimbursed state.

In the implementation, the reimbursement criteria can include reimbursement permission criteria, reimbursement amount criteria, and reimbursement duration criteria.

In the implementation, the reimbursement acceptor subscribes to a bill state of the target electronic bill maintained by the node; and the first update module 1002 can be configured to: after the target electronic bill is updated to the reimbursement lock state, push the reimbursement lock state of the target electronic bill to the reimbursement acceptor, so as to trigger the reimbursement acceptor to perform reimbursement processing on the target electronic bill in the reimbursement lock state.

In the implementation, the apparatus 100 can further include: a third update module 1005, configured to: if the reimbursement result is not monitored within predetermined duration, update the target electronic bill from the reimbursement lock state to the unreimbursed state.

In the implementation, the apparatus 100 can further include: a sending module 1006, configured to: if the target electronic bill is in the reimbursement lock state, send, to the reimbursement initiator, a notification message used to indicate that reimbursement for the target electronic bill fails.

For an implementation process of functions and roles of each module in the apparatus, reference can be made to an implementation process of a corresponding step in the previous method. Details are omitted here for simplicity.

Because an apparatus implementation corresponds to a method implementation, for related parts, references can be made to related descriptions in the method implementation. The previously described apparatus implementation is merely an example. The modules described as separate parts can or cannot be physically separate, and parts displayed as modules can or cannot be physical modules, can be located in one position, or can be distributed on a plurality of network modules. Some or all of the modules can be selected based on actual requirements to achieve the objectives of the solutions of the present specification. A person of ordinary skill in the art can understand and implement the implementations of the present application without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), input/output interface(s), network interface(s), and memory(ies).

The memory can include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for blockchain-based electronic bill reimbursement, comprising:
    in response to detecting a first reimbursement transaction broadcasted by a first reimbursement initiator for a target electronic bill to a blockchain that stores electronic bills, determining, by a blockchain node, whether the target electronic bill is in an unreimbursed state;
    in response to determining that the target electronic bill is in the unreimbursed state, updating the target electronic bill from the unreimbursed state to a reimbursement lock state;
    after the target electronic bill is updated to the reimbursement lock state, instructing a reimbursement acceptor to perform reimbursement processing on the target electronic bill;
    detecting a reimbursement result that is corresponding to the target electronic bill and that is broadcasted by the reimbursement acceptor to the blockchain;
    in response to detecting the reimbursement result, updating the target electronic bill from the reimbursement lock state to a reimbursed state;
    after the target electronic bill is updated to the reimbursement lock state and before the target electronic bill is updated to the reimbursed state, in response to detecting a second reimbursement transaction broadcasted by a second reimbursement initiator for the target electronic bill to the blockchain, determining, by the blockchain node, that the target electronic bill is in the reimbursement lock state; and in response to determining that the target electronic bill is in the reimbursement lock state, preventing duplicate reimbursement processing from being performed on the target electronic bill.

2. The computer-implemented method according to claim 1, wherein, in response to detecting the first reimbursement transaction broadcasted by the first reimbursement initiator for the first target electronic bill to a blockchain that stores electronic bills, determining whether the target electronic bill is in an unreimbursed state comprises:

in response to the first reimbursement transaction, invoking a reimbursement verification logic specified in a smart contract deployed on the blockchain to determine whether the target electronic bill satisfies reimbursement criteria; and in response to a monitored verification success event generated by the smart contract and corresponding to the target electronic bill, determining whether the target electronic bill is in the unreimbursed state.

3. The computer-implemented method according to claim 2, wherein the reimbursement criteria comprise reimbursement permission criteria, reimbursement amount criteria, and reimbursement duration criteria.

4. The computer-implemented method according to claim 1, wherein the reimbursement acceptor subscribes to a bill state of the target electronic bill maintained by the blockchain node; and after the target electronic bill is updated to the reimbursement lock state, instructing the reimbursement acceptor to perform reimbursement processing on the target electronic bill comprises:

after the target electronic bill is updated to the reimbursement lock state, pushing the reimbursement lock state of the target electronic bill to the reimbursement acceptor to trigger the reimbursement acceptor to perform reimbursement processing on the target electronic bill in the reimbursement lock state.

5. The computer-implemented method according to claim 1, wherein detecting the reimbursement result that is corresponding to the target electronic bill and that is broadcasted by the reimbursement acceptor to the blockchain comprises detecting the reimbursement result that is corresponding to the target electronic bill and that is broadcasted by the reimbursement acceptor to the blockchain for a predetermined duration.

6. The computer-implemented method according to claim 5, wherein the method further comprises:

in response to not detecting the reimbursement result within the predetermined duration, updating the target electronic bill from the reimbursement lock state to the unreimbursed state.

7. The computer-implemented method according to claim 1, wherein the method further comprises:

if the target electronic bill is in the reimbursement lock state, sending, to the second reimbursement initiator, a notification message indicating that reimbursement for the target electronic bill fails.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

in response to detecting a first reimbursement transaction broadcasted by a first reimbursement initiator for a target electronic bill to a blockchain that stores electronic bills, determining, by a blockchain node, whether the target electronic bill is in an unreimbursed state;

in response to determining that the target electronic bill is in the unreimbursed state, updating the target electronic bill from the unreimbursed state to a reimbursement lock state;

after the target electronic bill is updated to the reimbursement lock state, instructing a reimbursement acceptor to perform reimbursement processing on the target electronic bill;

detecting a reimbursement result that is corresponding to the target electronic bill and that is broadcasted by the reimbursement acceptor to the blockchain;

in response to detecting the reimbursement result, updating the target electronic bill from the reimbursement lock state to a reimbursed state;

after the target electronic bill is updated to the reimbursement lock state and before the target electronic bill is updated to the reimbursed state, in response to detecting a second reimbursement transaction broadcasted by a second reimbursement initiator for the target electronic bill to the blockchain, determining, by the blockchain node, that the target electronic bill is in the reimbursement lock state; and in response to determining that the target electronic bill is in the reimbursement lock state, preventing duplicate reimbursement processing from being performed on the target electronic bill.

9. The computer-implemented system according to claim 8, wherein, in response to detecting the reimbursement transaction broadcasted by the first reimbursement initiator for the target electronic bill to a blockchain that stores electronic bills, determining whether the target electronic bill is in an unreimbursed state comprises:

in response to the first reimbursement transaction, invoking a reimbursement verification logic specified in a smart contract deployed on the blockchain to determine whether the target electronic bill satisfies reimbursement criteria; and in response to a monitored verification success event generated by the smart contract and corresponding to the target electronic bill, determining whether the target electronic bill is in the unreimbursed state.

10. The computer-implemented system according to claim 9, wherein the reimbursement criteria comprise reimbursement permission criteria, reimbursement amount criteria, and reimbursement duration criteria.

11. The computer-implemented system according to claim 8, wherein the reimbursement acceptor subscribes to a bill state of the target electronic bill maintained by the blockchain node; and after the target electronic bill is updated to the reimbursement lock state, instructing the reimbursement acceptor to perform reimbursement processing on the target electronic bill comprises:

after the target electronic bill is updated to the reimbursement lock state, pushing the reimbursement lock state of the target electronic bill to the reimbursement acceptor to trigger the reimbursement acceptor to perform reimbursement processing on the target electronic bill in the reimbursement lock state.

12. The computer-implemented system according to claim 8, wherein detecting the reimbursement result that is corresponding to the target electronic bill and that is broadcasted by the reimbursement acceptor to the blockchain comprises detecting the reimbursement result that is corresponding to the target electronic bill and that is broadcasted by the reimbursement acceptor to the blockchain for a predetermined duration.

13. The computer-implemented system according to claim 12, wherein the operations further comprise:
in response to not detecting the reimbursement result within the predetermined duration, updating the target electronic bill from the reimbursement lock state to the unreimbursed state.

14. The computer-implemented system according to claim 8, wherein the operations further comprise:
if the target electronic bill is in the reimbursement lock state, sending, to the second reimbursement initiator, a notification message indicating that reimbursement for the target electronic bill fails.

15. A non-transitory, computer-readable medium storing one or more instructions executable by a computer system to perform operations comprising:
in response to detecting a first reimbursement transaction broadcasted by a first reimbursement initiator for a target electronic bill to a blockchain that stores electronic bills, determining, by a blockchain node, whether the target electronic bill is in an unreimbursed state;
in response to determining that the target electronic bill is in the unreimbursed state, updating the target electronic bill from the unreimbursed state to a reimbursement lock state;
after the target electronic bill is updated to the reimbursement lock state, instructing a reimbursement acceptor to perform reimbursement processing on the target electronic bill;
detecting a reimbursement result that is corresponding to the target electronic bill and that is broadcasted by the reimbursement acceptor to the blockchain;
in response to detecting the reimbursement result, updating the target electronic bill from the reimbursement lock state to a reimbursed state;
after the target electronic bill is updated to the reimbursement lock state and before the target electronic bill is updated to the reimbursed state, in response to detecting a second reimbursement transaction broadcasted by a second reimbursement initiator for the target electronic bill to the blockchain, determining, by the blockchain node, that the target electronic bill is in the reimbursement lock state; and
in response to determining that the target electronic bill is in the reimbursement lock state, preventing duplicate reimbursement processing from being performed on the target electronic bill.

16. The non-transitory, computer-readable medium according to claim 15, wherein, in response to detecting the first reimbursement transaction broadcasted by the first reimbursement initiator for the target electronic bill to a blockchain that stores electronic bills, determining whether the target electronic bill is in an unreimbursed state comprises:
in response to the first reimbursement transaction, invoking a reimbursement verification logic specified in a smart contract deployed on the blockchain to determine whether the target electronic bill satisfies reimbursement criteria; and
in response to a monitored verification success event generated by the smart contract and corresponding to the target electronic bill, determining whether the target electronic bill is in the unreimbursed state.

17. The non-transitory, computer-readable medium according to claim 16, wherein the reimbursement criteria comprise reimbursement permission criteria, reimbursement amount criteria, and reimbursement duration criteria.

18. The non-transitory, computer-readable medium according to claim 15, wherein the reimbursement acceptor subscribes to a bill state of the target electronic bill maintained by the blockchain node; and
after the target electronic bill is updated to the reimbursement lock state, instructing the reimbursement acceptor to perform reimbursement processing on the target electronic bill comprises:
after the target electronic bill is updated to the reimbursement lock state, pushing the reimbursement lock state of the target electronic bill to the reimbursement acceptor to trigger the reimbursement acceptor to perform reimbursement processing on the target electronic bill in the reimbursement lock state.

19. The non-transitory, computer-readable medium according to claim 15, wherein detecting the reimbursement result that is corresponding to the target electronic bill and that is broadcasted by the reimbursement acceptor to the blockchain comprises detecting the reimbursement result that is corresponding to the target electronic bill and that is broadcasted by the reimbursement acceptor to the blockchain for a predetermined duration, and the operations further comprise:
in response to not detecting the reimbursement result within the predetermined duration, updating the target electronic bill from the reimbursement lock state to the unreimbursed state.

20. The non-transitory, computer-readable medium according to claim 15, wherein the operations further comprise:
if the target electronic bill is in the reimbursement lock state, sending, to the second reimbursement initiator, a notification message indicating that reimbursement for the target electronic bill fails.

\* \* \* \* \*

UNITED STATES PATENT AND TRADEMARK OFFICE
CERTIFICATE OF CORRECTION

PATENT NO. : 10,963,854 B2
APPLICATION NO. : 16/779173
DATED : March 30, 2021
INVENTOR(S) : Ge Jin et al.

Page 1 of 1

It is certified that error appears in the above-identified patent and that said Letters Patent is hereby corrected as shown below:

In the Claims

Column 27, Line 8, In Claim 2, after "for the" delete "first".

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*